(12) United States Patent
Mellasse

(10) Patent No.: US 11,732,641 B2
(45) Date of Patent: Aug. 22, 2023

(54) INTERNAL COMBUSTION ENGINE WITH AN EPICYCLIC GEAR TRAIN AND RECIPROCATING PISTONS

(71) Applicant: Nabil Mellasse, Kenitra (MA)

(72) Inventor: Nabil Mellasse, Kenitra (MA)

(*) Notice: Subject to any disclaimer, the term of this patent is extended or adjusted under 35 U.S.C. 154(b) by 43 days.

(21) Appl. No.: 17/619,235

(22) PCT Filed: Jun. 14, 2019

(86) PCT No.: PCT/IB2019/000512
§ 371 (c)(1),
(2) Date: Dec. 14, 2021

(87) PCT Pub. No.: WO2020/053642
PCT Pub. Date: Mar. 19, 2020

(65) Prior Publication Data
US 2022/0282664 A1 Sep. 8, 2022

(51) Int. Cl.
*F02B 61/06* (2006.01)
*F02B 75/22* (2006.01)
*F02F 7/00* (2006.01)
*F16H 1/28* (2006.01)

(52) U.S. Cl.
CPC ............ *F02B 61/06* (2013.01); *F02B 75/222* (2013.01); *F02F 7/0017* (2013.01); *F16H 1/28* (2013.01)

(58) Field of Classification Search
CPC ....... F02B 61/06; F02B 75/222; F02F 7/0017; F16H 1/28; F01B 9/042; F01B 2009/045
USPC ....... 123/54.1, 54.2, 78 F, 90.1, 90.15, 90.2, 123/90.21, 197.3, 197.4
See application file for complete search history.

(56) References Cited

U.S. PATENT DOCUMENTS 10,927,755 B1* 2/2021 Pompeu ............... F02B 75/32
11,473,654 B2* 10/2022 Yuan ..................... F02B 75/32
(Continued)

FOREIGN PATENT DOCUMENTS

| WO | 2004029481 A1 | 4/2004 |
| WO | 2011029160 A1 | 3/2011 |
| WO | 2014037758 A1 | 3/2014 |

OTHER PUBLICATIONS

Mellasse, N., PCT/IB2019/000512, International Search Report, dated Mar. 19, 2020, 6 pages (including English translation).
(Continued)

*Primary Examiner* — Hai H Huynh

(57) ABSTRACT

Internal combustion engine with cylinders disposed radially around an axis (Z), in each of which slides a piston carrying out reciprocating rectilinear movements, reversibly transformed into a continuous rotation of an output shaft by: an active unit and passive unit each respectively having a planet gear, the axis of which is parallel to (Z), being capable of meshing with a ring gear, being maintained on its orbit via a planet carrier and having a pitch diameter identical to the pitch radius of the corresponding ring gear. The planet gear is driven in rotation by the planet gear and/or the planet carrier. Each planet gear is respectively rigidly connected to a connecting rod having crank pins, the axes of which are parallel to the axis (Z), pass through the pitch circle of the corresponding planet gear and being capable of cooperating by contact with rods rigidly connected to the pistons.

15 Claims, 32 Drawing Sheets

(56) References Cited

U.S. PATENT DOCUMENTS

2015/0247452 A1   9/2015   Haynes
2018/0163623 A1   6/2018   Sokalski

OTHER PUBLICATIONS

Mellasse, N., PCT/IB2019/000512, Written Opinion, dated Mar. 19, 2020, 10 pages (including English translation).

* cited by examiner

Section A-A

Section A-A

Section A-A

Section A-A

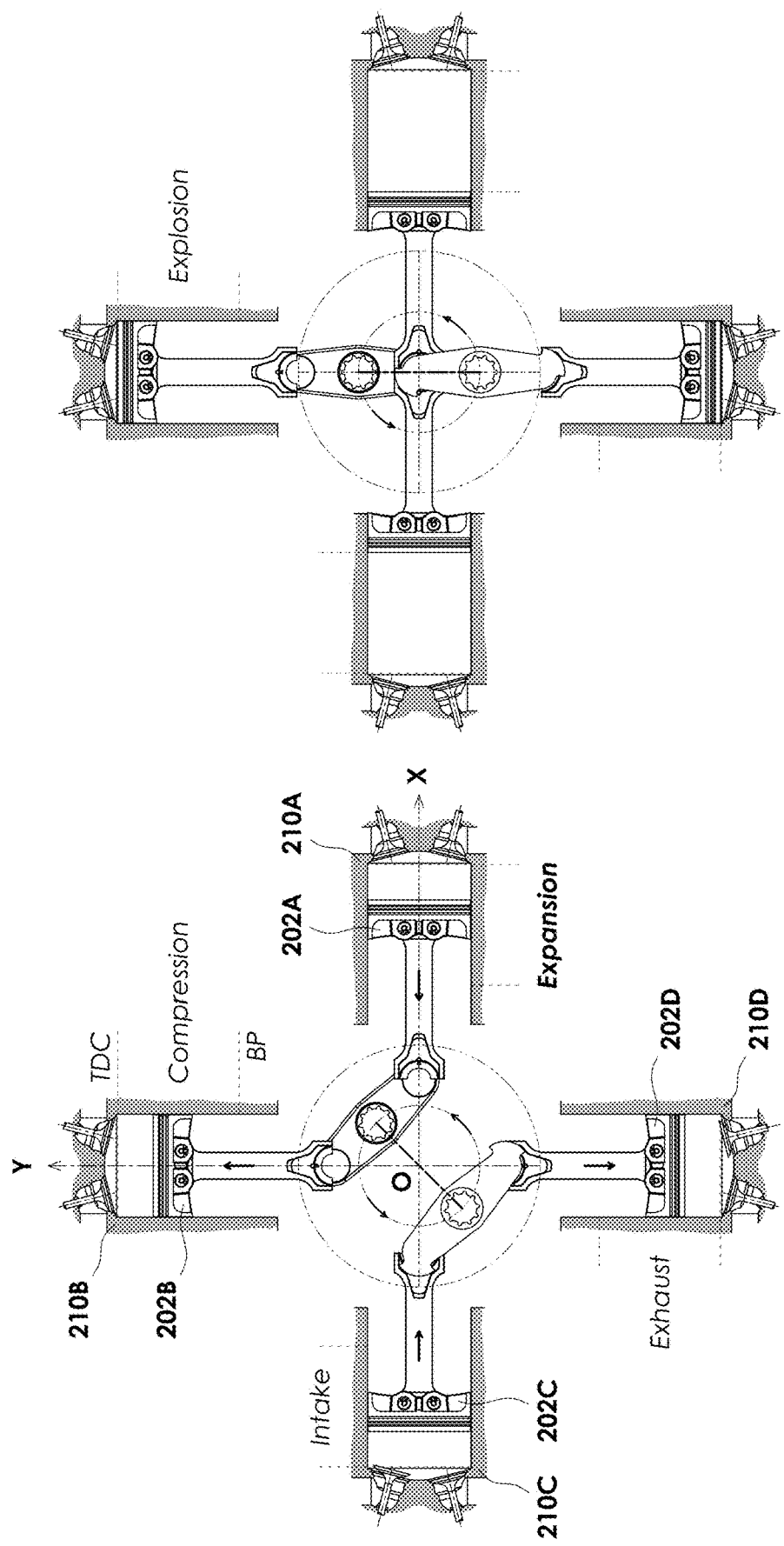

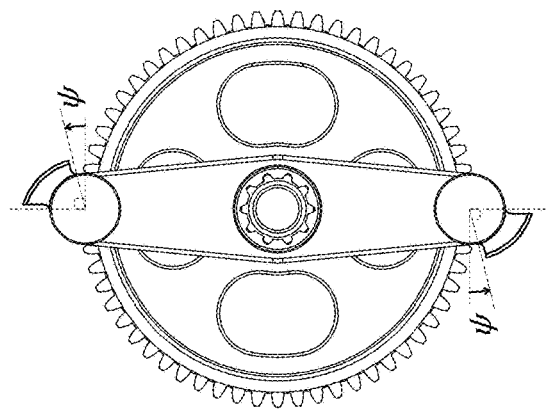
Fig. 62
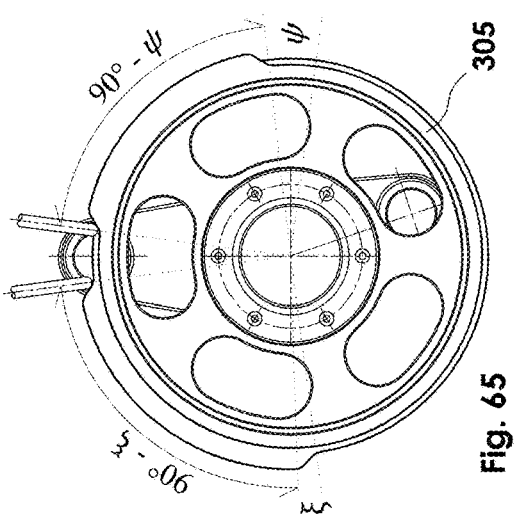
Fig. 65
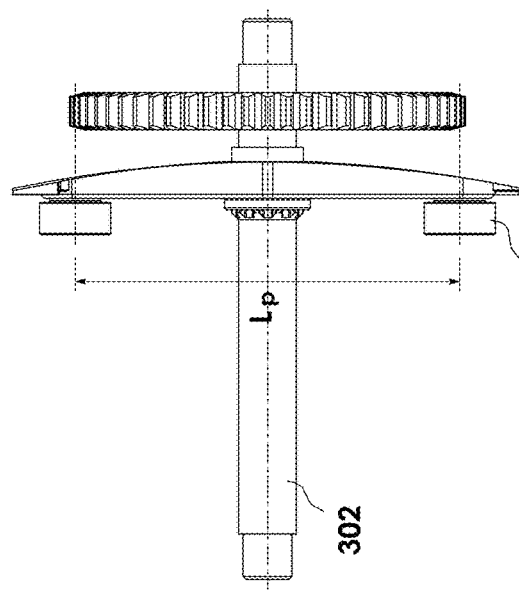
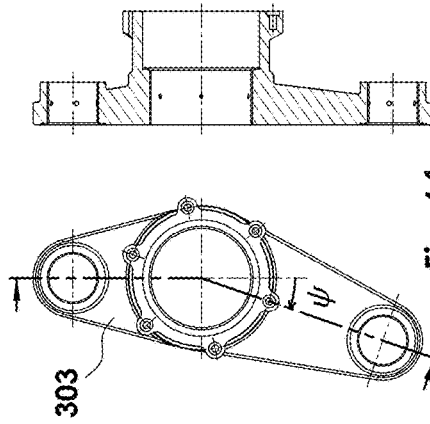
Fig. 64
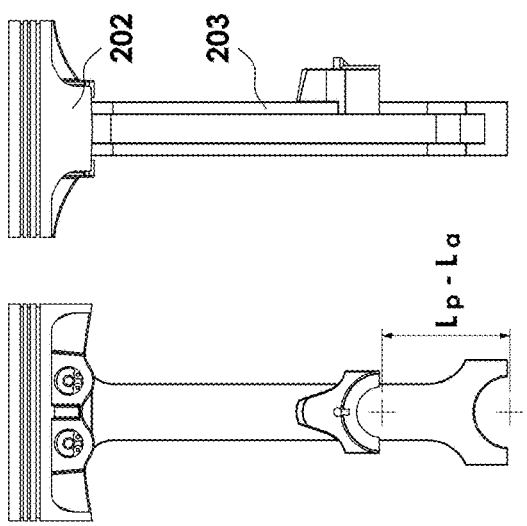
Fig. 61
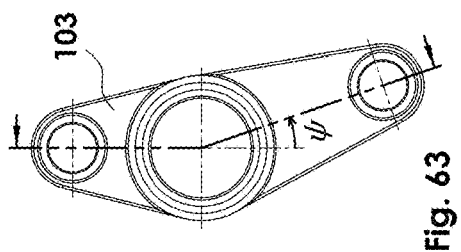
Fig. 63

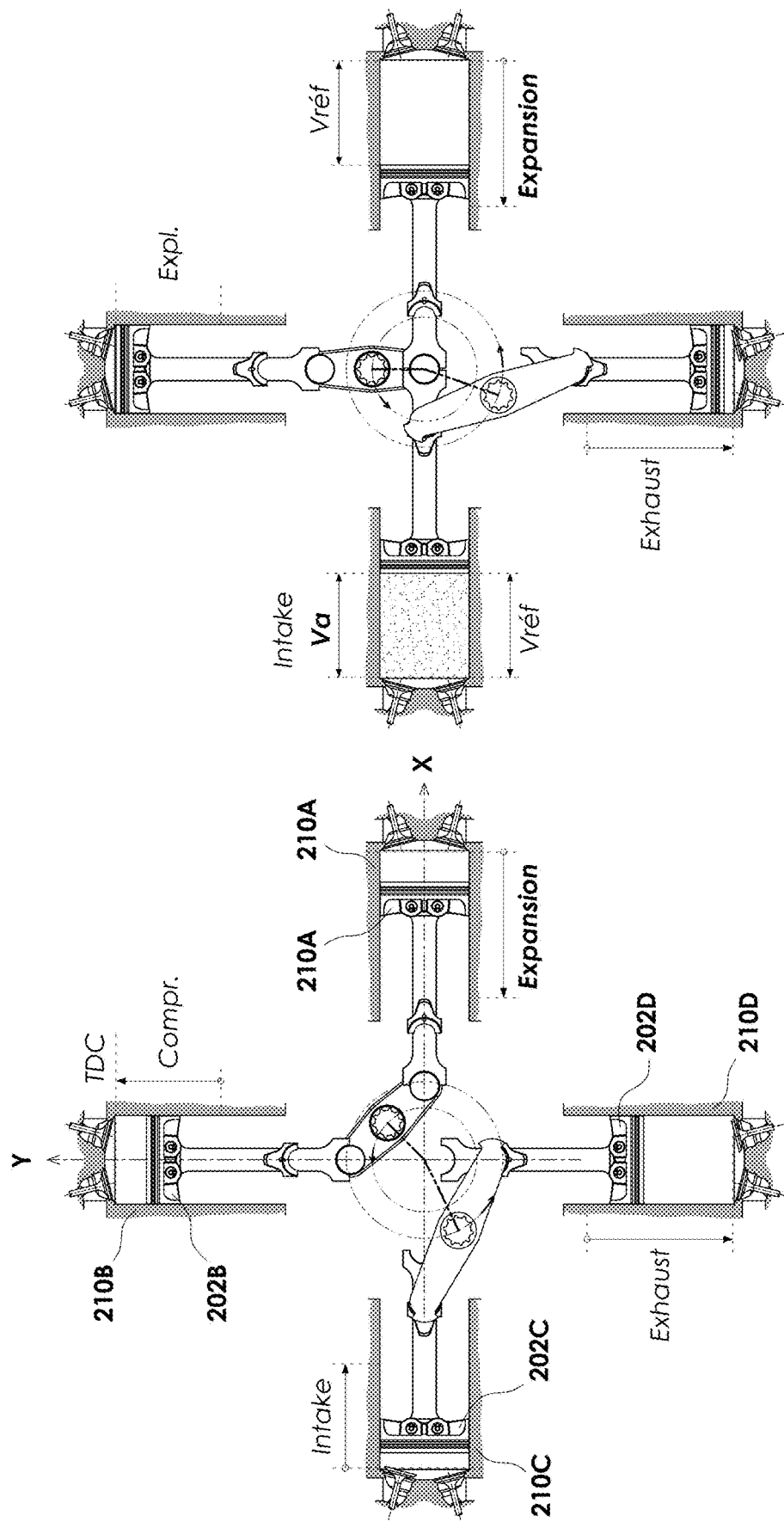

INTERNAL COMBUSTION ENGINE WITH AN EPICYCLIC GEAR TRAIN AND RECIPROCATING PISTONS

I. TECHNICAL FIELD

The present invention relates to internal combustion engines, in particular the engines with four strokes and reciprocating pistons, allowing to convert the heat energy released by the combustion of a gaseous system in cylinders into mechanical energy in the form of a rotary torque available to an output shaft. This engine is intended mainly to be used for the propulsion of transport vehicles such as airplanes, automobiles, trucks, boats, etc., as well as for fixed facilities such as engine-generators.

II. PRIOR ART

The internal combustion engines most used at present are engines with four strokes and with reciprocating pistons, which comprise one or more cylinders, closed by a cylinder head connecting the cylinders to intake and exhaust manifolds and equipped with valves controlled by one or more cam shafts. Inside each cylinder slides a piston intended to carry out reciprocating rectilinear movements. These movements are transformed into a continuous rotation of an output shaft and vice versa via the conventional crank connecting rod system routinely implemented in most of the engines with reciprocating pistons. The cylinder head and the head of the piston thus define a combustion chamber, the volume of which undergoes a cyclical variation between a minimum and a maximum, respectively corresponding to the moments at which the piston is at TDC and BDC of its stroke. This cyclical variation allows to implement the four strokes of an engine cycle, according to the operating principle widely known in the prior art, in order to convert the heat energy released by a gaseous system in combustion into mechanical work. Moreover, the transformation of the reciprocating movements of the pistons by a system such as that with a crank and connecting rod has a major disadvantage: since the compression stroke is identical to that of expansion, the pressure in the combustion chamber at the end of expansion always remains greater than the atmospheric pressure, i.e. the energy provided to the piston by the expanding gaseous system cannot be entirely recovered before the opening of the exhaust valves, because the piston inevitably goes back up after BDC. The performance of the engines using such a transformation system consequently finds itself limited. To overcome this limitation, it would therefore be judicious to design a system for transforming the movements allowing to provide the piston with an expansion volume prolonged with respect to that of compression, in order to reduce as much as possible, the pressure in the combustion chamber at the end of expansion and thus take more advantage of the energy provided by the expanding gaseous system.

III. DISCLOSURE OF THE INVENTION

The present invention aims to overcome the disadvantages that the engines with four strokes and with reciprocating pistons known in the prior art have, by proposing an engine with a less constraining architecture, specified by a system for transforming movements capable of providing the pistons with an expansion stroke prolonged with respect to that of compression, with a view to taking the most advantage of the heat energy released by the combustion of the fuel.

To do this, according to the invention, an internal combustion engine 1 with an epicyclic gear train and reciprocating pistons is proposed, comprising:

A cylinder block 200 comprising:
  a collar 201 being configured to bring together a number of cylinders 210 at least equal to one, disposed radially around an axis Z and rigidly connected to the collar 201, the axes of said cylinders 210 called main axes of the engine 1 being perpendicular to the axis Z at a point O, the plane orthogonal to the axis Z and passing through the point O is called main plane P, each of said cylinders 210 comprises in its upper part:
    At least two valves 211, one of the two valves 211 being an intake valve and the other of the two valves 211 being an exhaust valve, each of said valves 211 is guided in translation along its axis in the cylinder 210 and being maintained closed by a spring 214 mounted between the cylinder 210 and a retainer 212 abutting against the stem of the valve 211 via a lock 213, said spring 214 being intended to exert a restoring force on the retainer 212 in such a way as to maintain the valve 211 closed,
    At least two rocker arms 215 kinematically connected to the cylinder 210 capable of cooperating by contact with the valves 211 and being arranged in such a way as to deform the spring 214 to ensure the opening of the valves 211, each rocker arm 215 is rigidly connected to a rod 216 by a fixing system allowing an adjustment of their relative position,
  Inside each of said cylinders 210 slides a piston 202 guided in coaxial translation in the corresponding cylinder 210 and being intended to carry out reciprocating linear movements, the head of the piston 202 and the bottom of the corresponding cylinder 210 define a combustion chamber in which the four strokes of an engine cycle occur, the volume of said combustion chamber being variable between a minimum, reached at a moment of the cycle corresponding to a position of the piston 202 called top dead center TDC and a maximum reached at a moment of the cycle corresponding to a position of the piston 202 called bottom point BP, each combustion chamber being supplied by an intake system of an oxidizing gas and a fuel and being in communication with an exhaust system of the burnt gases,
  A device mounted between each of the pistons 202 and the corresponding cylinder 210 allowing to ensure the sealing of the combustion chamber: the usual rings of the pistons known in the prior art are an example of said device, generally three rings are located at the top of the piston, namely a first compression ring, a sealing or second compression ring, and a scraper ring,
  A rod 203 rigidly connected to the piston 202 and arranged to move in longitudinal translation along the axis of the corresponding piston 202,
At least one radial cam 305 guided in rotation about the axis Z arranged to be driven in rotation by at least one of the rotating members of the engine 1 and being intended to actuate on each of the rocker arms 215 by a device comprising at least:
  a follower 306 guided in translation with respect to its axis, capable of cooperating by contact with said cam 305 and being intended to follow a cam path, a rocker arm rod 307 mounted between the follower 306 and the rod 216 and being arranged in such a way as to transmit the movements of displacement of the follower 306 to the rocker arm 215 to control the opening of the valve 211 in synchronization with the rotation of the engine 1, the cam 305 is provided with at least two distinct outer profiles, a first profile controlling the opening of the intake valves and a second profile controlling the opening of those for exhaust.

The arrangement of the cylinders and the distribution system described above are known in the prior art in the engines called radial, according to which the cylinders are placed in the same plane around a crankshaft comprising a single crank pin, to which one of the connecting rods called master connecting rod and onto which the "secondary" connecting rods are articulated is connected. The transformation of reciprocating linear movements of the pistons into a movement of continuous rotation of the crankshaft in the radial engine as well as the majority of the piston engines used at present is ensured by the conventional crank connecting rod system, in the case of the engine 1 according to the invention, this transformation of movements is ensured by a system, other than that with a crank and connecting rod, simple to carry out comprising:

At least one active unit 100 comprising a set of members arranged in such a way as to form an epicyclic gear train comprising at least:
- a ring gear 101 mounted coaxially with respect to the axis Z being rigidly connected or derived from material of the collar 201 and being located on a first side of the main plane P,
- a planet gear 102 whose axis is parallel to the axis Z comprising at least one first toothing capable of meshing with the ring gear 101 and being maintained on its orbit by a planet carrier 103 guided in rotation about the axis Z, the planet gear 102 is connected at a first end of its axis to the planet carrier 103 by a pivot connection, the pitch diameter of the first toothing of the planet gear 102 being equal to the pitch radius of the ring gear 101
- the active unit 100 further comprises a connecting rod 104 fixed onto the axis of the planet gear 102 by a fixing means ensuring a rigid and complete connection: a connection with splines is an example of said fixing means.
- The connecting rod 104 has a number of crank pins I equal to the number of the main axes of the engine 1, the axes of said crank pins I are parallel to the axis of the planet gear 102, pass through the pitch circle of the first toothing of the planet gear 102 and disposed in such a way that when the planet carrier 103 rotates about the axis Z, the projection of the axis of each of the crank pins I on the main plane P carries out a reciprocating rectilinear movement along a main axis of the engine 1 by describing a segment, called path of the crank pin I, the center of which is the point O and the length of which is equal to the pitch diameter of the ring gear 101,
- the active unit 100 being intended to cooperate by contact via the crank pins I with the rods 203 to carry out a reversible transformation of the reciprocating translation movements of the pistons 202 of the cylinder block 200 into a continuous rotational movement of the planet carrier 103.

At least one passive unit 300 comprising a set of members arranged in such a way as to form an epicyclic gear train comprising at least:
- a ring gear 301 mounted coaxially with respect to the axis Z and being rigidly connected or derived from material of the collar 201 and being located on the opposite side to the first side of the main plane P,
- a planet gear 302 whose axis is parallel to the axis Z comprising at least one toothing capable of meshing with the ring gear 301 and being maintained on its orbit by a planet carrier 303 guided in rotation about the axis Z, the planet gear 302 is connected at a first end of its axis to the planet carrier 303 by a pivot connection, the pitch diameter of the toothing of the planet gear 302 being equal to the pitch radius of the ring gear 301, the planet carrier 303 is arranged to be driven in rotation by at least one of the rotating members of the active unit 100,
- the passive unit 300 further comprises a connecting rod 304 fixed onto the axis of the planet gear 302 by a fixing means ensuring a complete rigid connection: a connection with splines is an example of said fixing means.
- The connecting rod 304 has a number of crank pins I' equal to the number of the main axes of the engine 1, the axes of said crank pins I' are parallel to the axis of the planet gear 302, pass through the pitch circle of the toothing of the planet gear 302 and disposed in such a way that when the planet carrier 303 rotates about the axis Z, the projection of the axis of each of the crank pins I' on the main plane P carries out a reciprocating rectilinear movement along a main axis of the engine 1 by describing a segment, called path of the crank pin I', the center of which is the point O and the length of which is equal to the pitch diameter of the ring gear 301,
- the passive unit 300 being intended to cooperate by contact, via the crank pins I', with the rods 203 to carry out a transformation of a continuous rotational movement of the planet carrier 303 into reciprocating translational movements of the pistons 202 of the cylinder block 200.

an output shaft 105 guided in rotation about the axis Z and arranged to be driven in rotation by at least one of the rotating members of the engine 1.

The engine 1 according to the invention is an internal combustion engine with reciprocating pistons, the operating cycle of which breaks down into four strokes: compression, expansion, exhaust and intake. The movement of the piston is initiated by the combustion of a mixture of fuel and of oxidizer that takes place during the power stroke. This is the only stroke producing energy, the three other strokes consume some but make it possible. The piston moves during starting via an outside source of energy, often a starter or a kickstarter temporarily coupled to the output shaft until at least one power stroke produces a force capable of ensuring the three other strokes before the next power stroke. The engine then functions autonomously and produces a torque on its output shaft.

According to a preferred embodiment, the implementation of the four strokes of the cycle is distributed to the two units of the engine 1 in the following manner: the active unit 100 actuates the pistons 202, by means of the connecting rod 104, to ensure the compression of the gases in the corresponding cylinders and then transforms the work provided by the gaseous system during the expansion into a rotary torque at the output shaft 105, a part of said work is devoted to driving in rotation the rotary members of the passive unit 300, which in turn actuates the pistons 202 by means of the connecting rod 304 to ensure the two other remaining strokes: exhaust and intake.

According to one embodiment, the rod 203 is rigidly connected to the piston 202 via two pins 204, the axes of which are parallel to the axis Z, the rod 203 has a first and a second support each having an open semicylindrical shape whose axis is parallel to the axis Z and being able to cooperate by contact respectively with the crank pins I and I' following paths along the main axis of the piston 202 corresponding to said rod 203, the rod 203 being disconnected from the connecting rods 104 and 304 is able to cooperate with said crank pins I and I' by simple thrust and in a spontaneous manner during expansion, compression and exhaust, phases in which the rod 203 is stressed in compression.

Preferably, the diameter of each of said supports is identical to the diameter of the crank pin with which it cooperates, to provide a maximum contact surface in order to avoid the concentration of the stresses during their interaction. Moreover, it is clear that this mode of interaction only allows the transmission of the stresses at which the rod 203 and the crank pins push each other, in other words, the crank pins can in no case pull the rod 203, given the open shape of its supports. During intake, the only cycle in which it is necessary to pull the piston 202 to suck up the air, it is indispensable to provide a hooking mechanism, intended to establish a connection between the rod 203 and the connecting rod 304, allowing the latter to pull the piston 202 in order to create the vacuum required for the suction of the gases and to release said connection at the latest at the beginning of compression.

According to one embodiment, the hooking mechanism comprising a groove cut into a surface of the connecting rod 304 parallel to the main plane P, opening on a first side called input side and on a second side called output side, and a finger integral with or derived from material of the rod 203 capable of sliding in said groove during the intake phase, the groove is configured in such a way that said finger enters through the input side at the latest at the beginning of the intake phase and exits through the output side at the latest at the beginning of the compression phase.

It is judicious to note that the angle that the connecting rod 304 makes with the rod 203 varies according to the position of the corresponding crank pin, this offers the possibility of limiting the connection established by the hooking mechanism only during intake, by varying only the angular interval β of the aforementioned groove with respect to the axis of the crank pin (see FIG. 38).

For example, FIG. 39 makes clear the various relative positions between the connecting rod 304 and the rod 203 during exhaust then intake in the case in which β=90°:

Position a: the connecting rod 304 pushes the rod 203 towards TDC during the exhaust phase, the connection between the two parts is not necessary, Position b: the piston 202 reaches its TDC, the crank pin being in contact with the rod 203, the finger enters the groove through the input side downstream of TDC, Position c: the connection between the rod 203 and the connecting rod 304 is established, allowing to pull the piston to ensure intake, Position d: the finger exits the groove through the output side, the connecting rod releases the rod of the piston at the latest at the beginning of compression.

All of the rotary members of the passive unit 300 are capable of being driven by at least one of the rotary members of the active unit 100, according to a preferred embodiment: each of the planet gears 102 and 302 is connected at the second end of its axis to the planet carrier of the opposite unit by a pivot connection, in other words, each of the planet gears 102 and 302 is guided in rotation about its axis by both of the two planet carriers 103 and 303, as a result the two planet gears 102 and 302 gravitate around the axis Z in the same direction and at the same speed of rotation.

The four strokes of the cycle occur in each of the cylinders 210 in a spontaneous manner according to the following operating principle: the crank pin I of the connecting rod 104 comes into contact with the first support of the rod 203 of a piston 202 at the moment of completion of intake at a first point of its path called first tipping point FTP characterizing the beginning of the compression phase and pushes said piston 202 until it reaches its highest point at TDC at which the speed of said crank pin I is canceled out and at which the compression is maximum, the combustion of the oxidizer/fuel mixture taking place in the vicinity of TDC, the expanding hot gases push said piston 202, which in turn pushes said crank pin I by means of the rod 203, until the end of expansion is reached, when said rod 203 and said crank pin I separate at a second point called second tipping point STP, characterizing the beginning of the exhaust phase.

A crank pin I' of the connecting rod 304 comes into contact with the second support of the rod 203 at the moment at which said crank pin I is at the second tipping point STP, ending the expansion phase, and pushes said piston 202 to release the burnt gases through the exhaust system until it reaches TDC, at which moment the speed of said crank pin I' is cancelled out, the connection between the rod 203 and the connecting rod 304 being established via the hooking system, allowing the connecting rod 304 to pull the piston 202 to ensure the intake phase until the moment at which said crank pin I reaches the first tipping point FTP where said connection between the rod 203 and the connecting rod 304 is released.

The stroke of the piston 202 is thus equal to the distance travelled between TDC and the BP corresponding to the second tipping point STP, said distance is equal to at least the pitch radius of the ring gear 101, a stroke equal to the pitch radius of the ring gear 101 is called reference stroke and the volume swept by the piston 202 traveling on said reference stroke is called reference volume.

Moreover, it is judicious to highlight the mode of transmission of the stresses between the crank pinks of the connecting rods 104 and 304 and the rod 203 during the various phases of the engine cycle. FIG. 38 shows the resultant, noted as R1, of the contact stresses exerted by the crank pin I of the connecting rod 104 on the rod 203. Given that the resultant of the pressure forces, exerted by the gaseous system on the piston 202 during expansion, is considerable, preferably, the latter is colinear with the resultant R1, in order to avoid the moment engendered by the off-centering of said resultants, which can cause undesirable effects: friction, wear of the piston rings, locking up, etc. The length of the crank pin is determined, consequently, in such a way as to be able to provide a sufficient contact surface capable of fulfilling said condition of collinearity.

Nevertheless, the stresses exerted by the crank pin I' of the connecting rod 304 on the rod 203 inevitably engender a parasite moment, caused by the off-centering of their resultant, noted as R1 (see FIG. 38). To balance out this parasite moment, according to one embodiment, the rod 304 is guided in translation in the collar 201 or in one of the members rigidly connected to it.

According to another embodiment, each of the crank pins I' of the connecting rod 304 has a circular recess in which a tab coming from the rod 203 is housed, allowing to provide a bearing surface orthogonal to that of the resultant R2, capable of engendering contact stresses opposing said off-centering moment: see the detail of FIG. 38.

According to a preferred embodiment, the output shaft 105 is guided in rotation in the ring gear by a rotation guide device 107, and rigidly connected on one of its ends to a sun gear 106, the planet gear 102 comprises a second toothing capable of meshing with the sun gear 106, the output shaft 105 being intended, on the one hand, to be driven in rotation about the axis Z by the planet gear 102 and on the other hand, to ensure the guiding in rotation of the planet carrier 103.

According to one embodiment, the radial cm 305 is rigidly connected to the planet carrier 303, the assembly is guided in rotation about the axis Z by a shaft rigidly connected or derived from material of the ring gear 301, the cam 305 being capable of being driven in rotation by the planet carrier 303, cooperates by contact with the followers 306 guided in translation in the ring gear 301 and disposed radially around the axis Z in the following manner: the followers controlling the opening of the intake valves are uniformly distributed around the axis Z in a first plane P1, parallel to the main plane P and passing through the first outer profile of the cam 305. Likewise, the followers controlling the opening of the exhaust valves are uniformly distributed around the axis Z in a second plane P2 passing through the second outer profile of the cam 305 and being in parallel offset with respect to the first plane P1: as illustrated by FIG. 36. Each of the rocker arm rods 307 is connected on its ends to the corresponding rod 216 and to the corresponding follower 306 by a spherical connection. FIGS. 35 and 36 highlight all of the parts that are involved in ensuring the opening of the intake and exhaust valves in synchronization with the movements of the pistons.

According to a first aspect, the engine 1 according to the invention comprises four cylinders 210 uniformly distributed around the axis Z in such a way that each main axis is an axis shared by two opposite cylinders, the two main axes are called X and Y and being perpendicular to the point O. The connecting rod 104 thus has two crank pins I and J, the axes of which are symmetrical with respect to the axis of the planet gear 102, and arranged in such a way that the paths of the crank pins I and J respectively belong to the main axes X and Y. Likewise, the connecting rod 304 has two crank pins I' and J', the axes of which are symmetrical with respect to the axis of the planet gear 302, and arranged in such a way that the paths of the crank pins I' and J' respectively belong to the main axes X and Y.

IV. BRIEF DESCRIPTION OF THE DRAWINGS

Other features, details and advantages of the invention will be clearer upon reading the detailed description of several specific embodiments of the invention, given below only for informational and non-limiting purposes, in reference to the appended drawings, in which the present invention has been illustrated according to a first aspect in which the engine according to the invention comprises four cylinders uniformly distributed around its axis, which illustrate:

Figure 1:
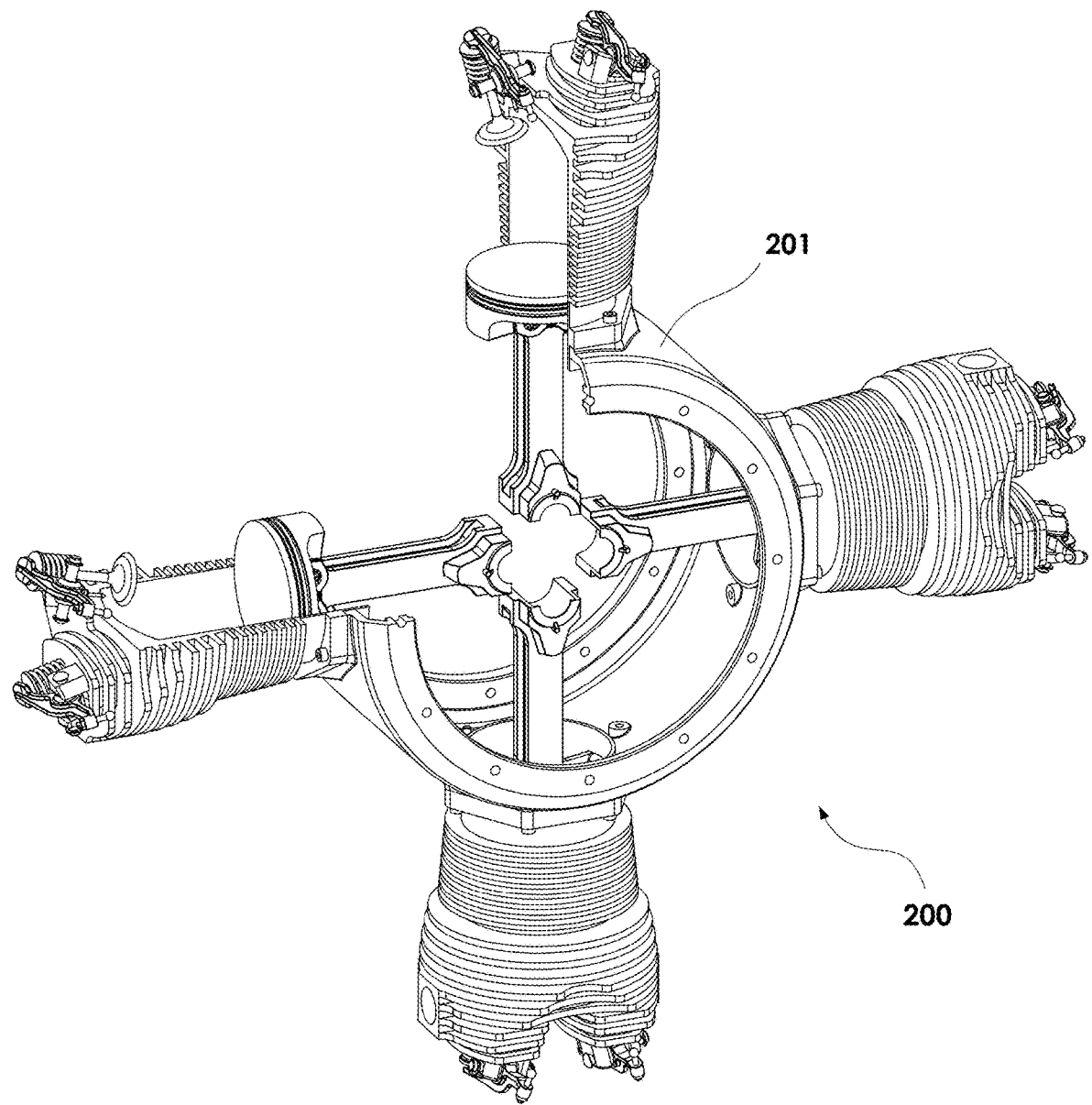
FIGS. 1, 2 and 3 show a perspective view and various views of the cylinder block.
Figure 3:
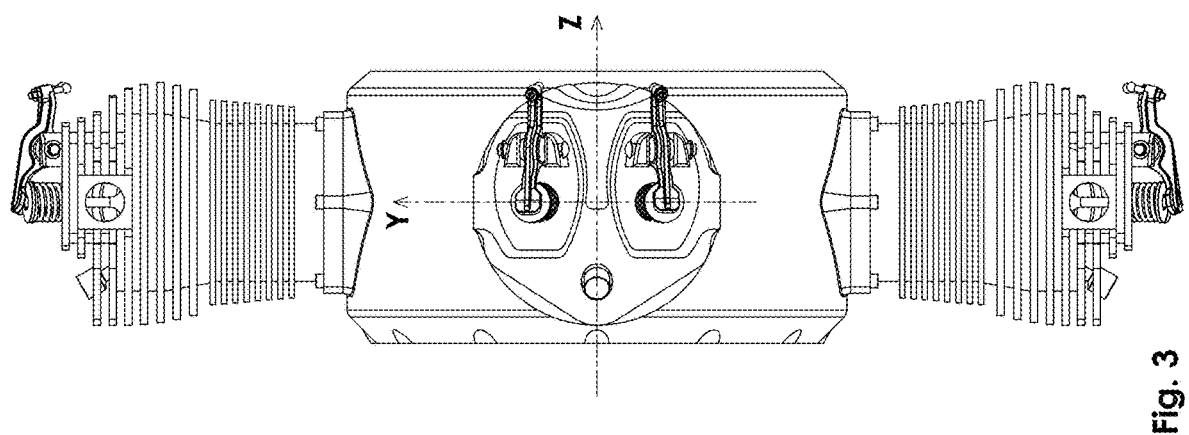
Figure 2:
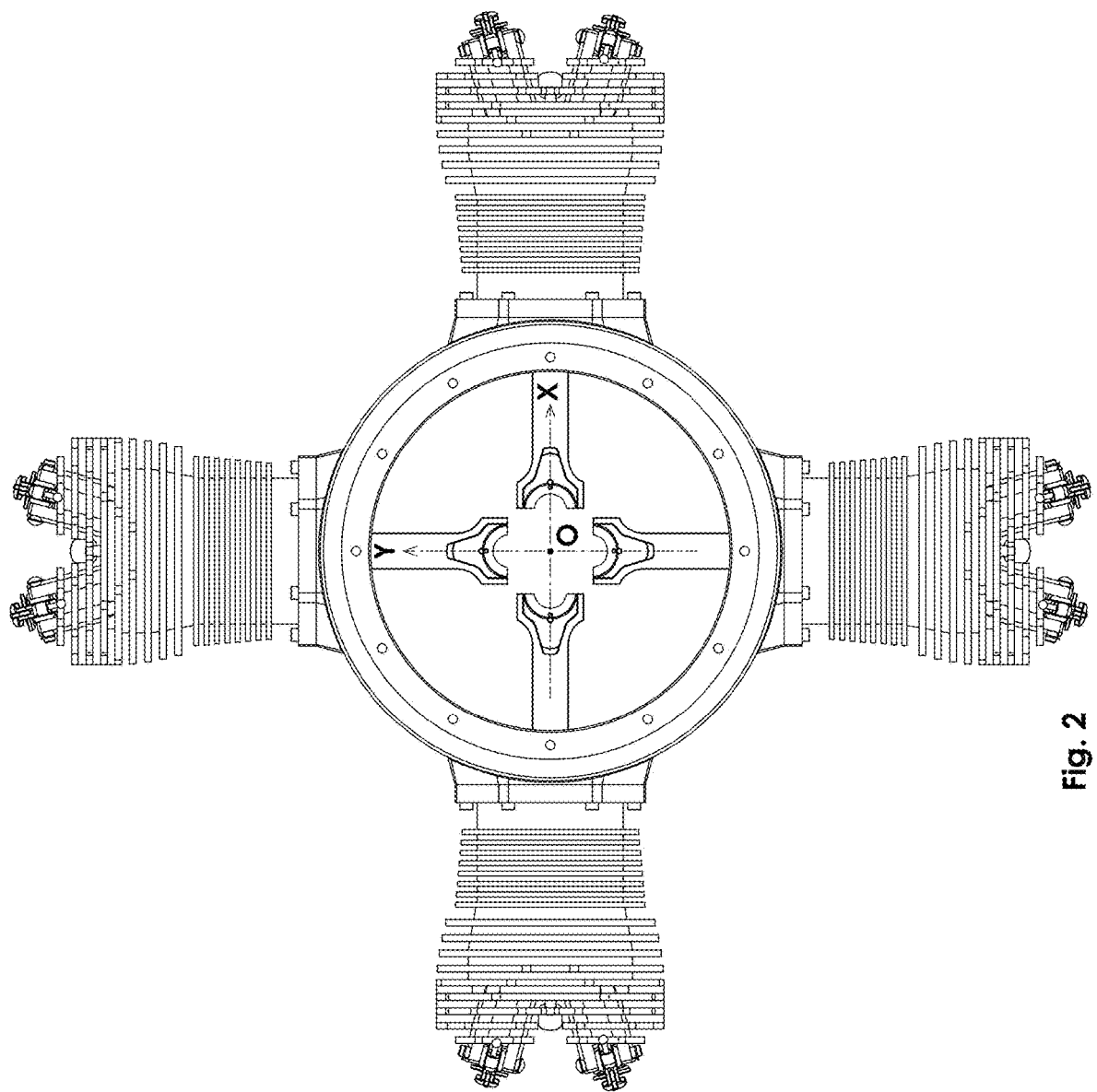
Figure 4:
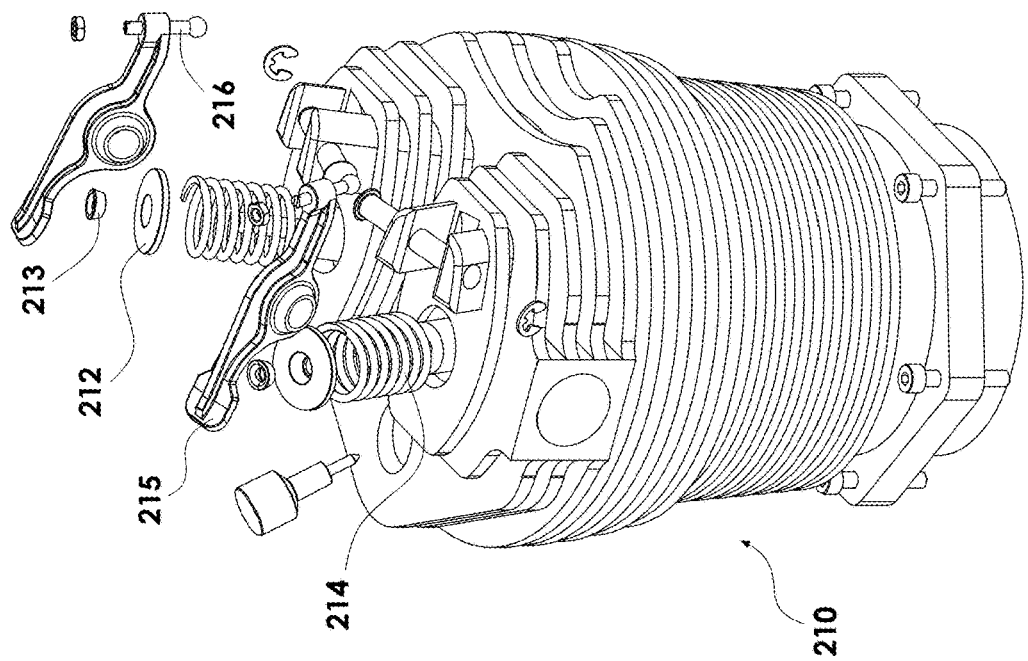
FIG. 4 shows an exploded perspective view of the cylinder.
Figure 5:
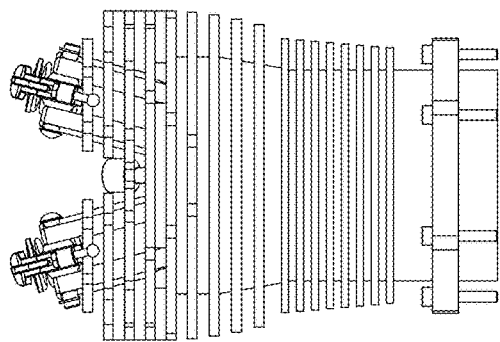
Figure 6:
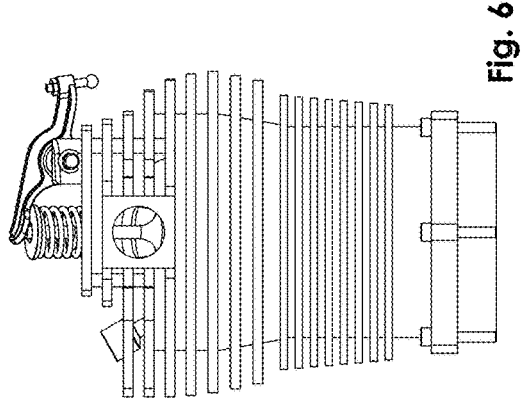
Figure 8:
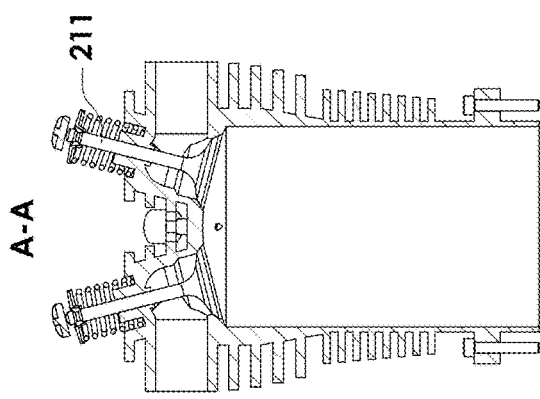
Figure 7:
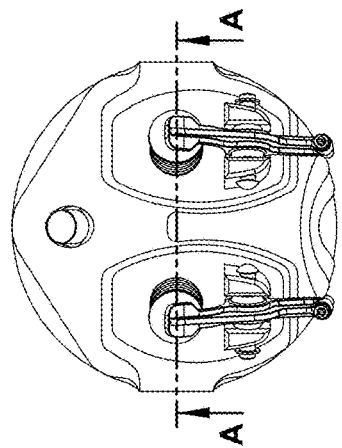
Figure 9:
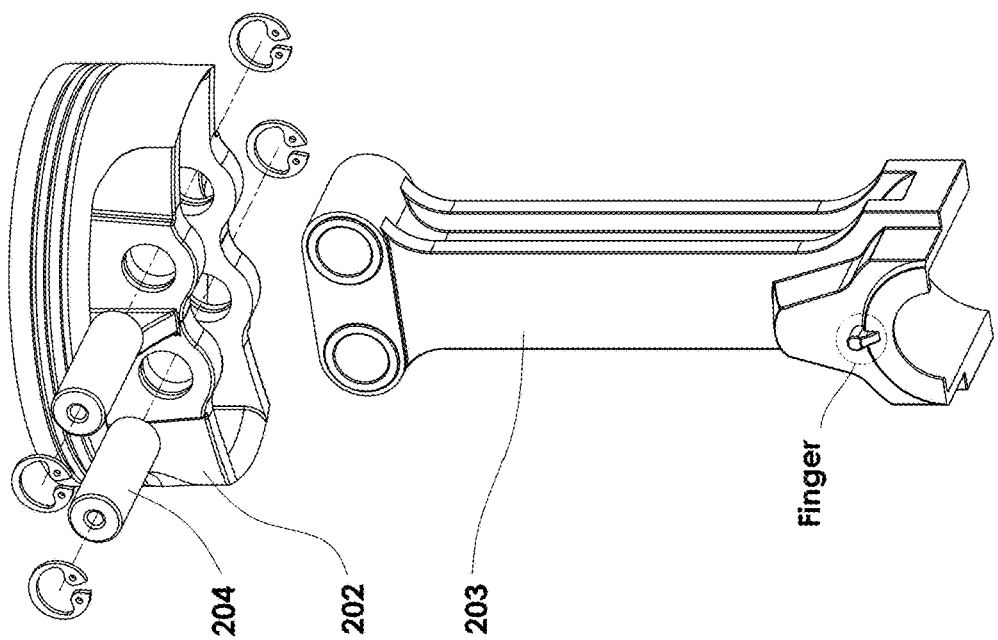
Figure 12:
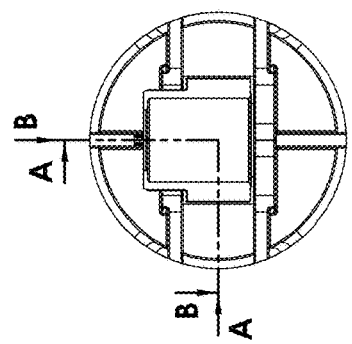
Figure 11:
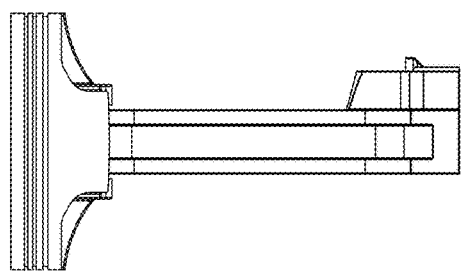
Figure 13:
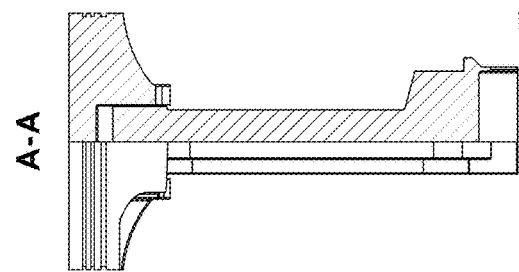
Figure 10:
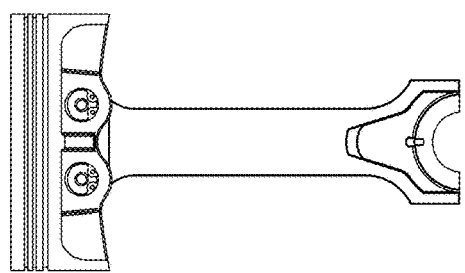
Figure 14:
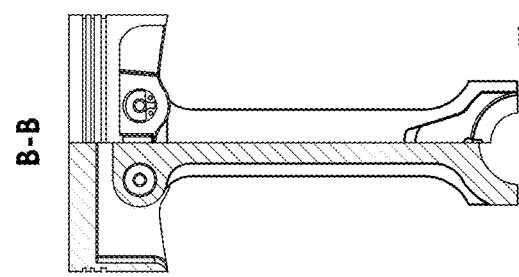
Figure 15:
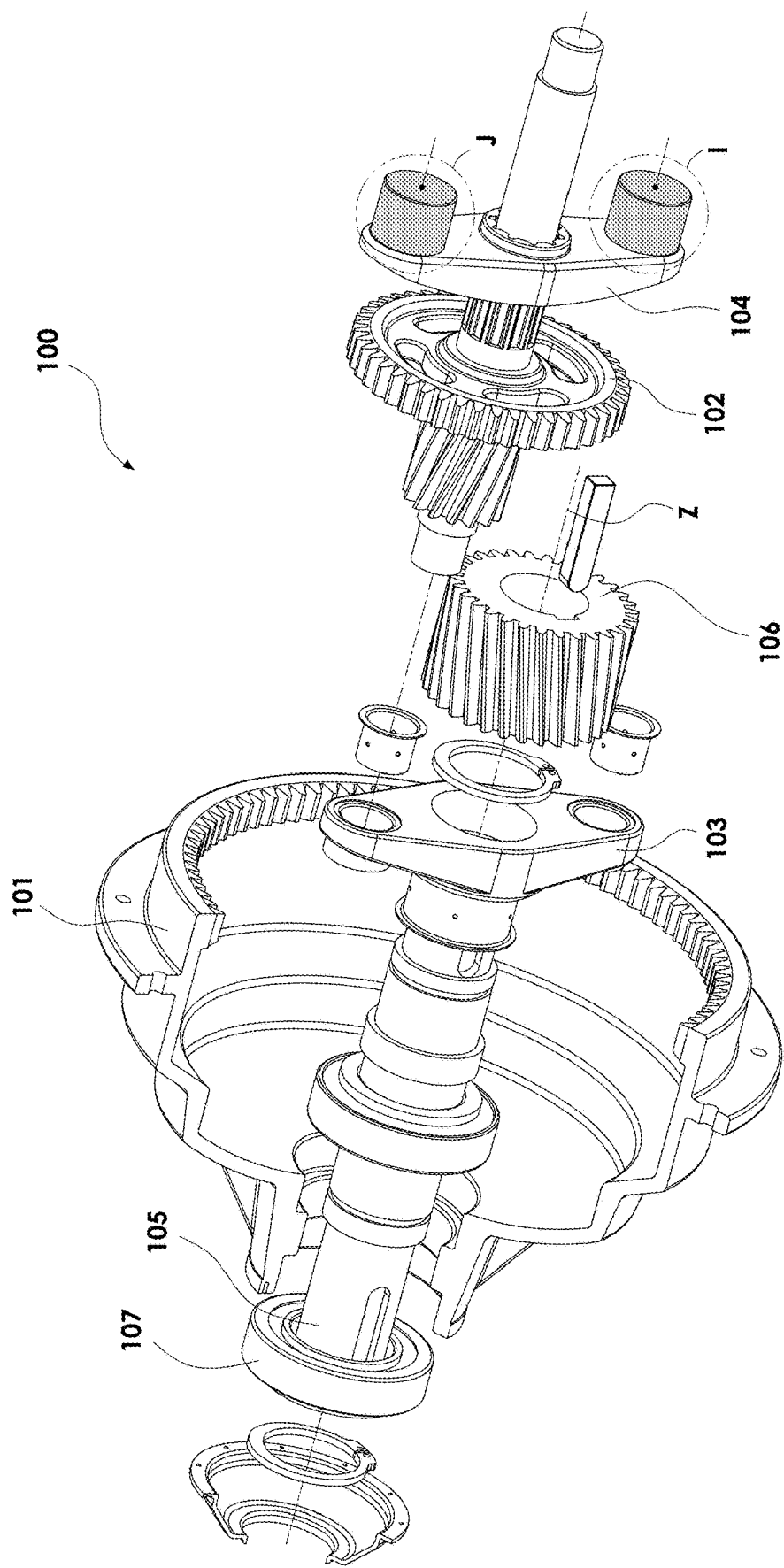
Figure 16:
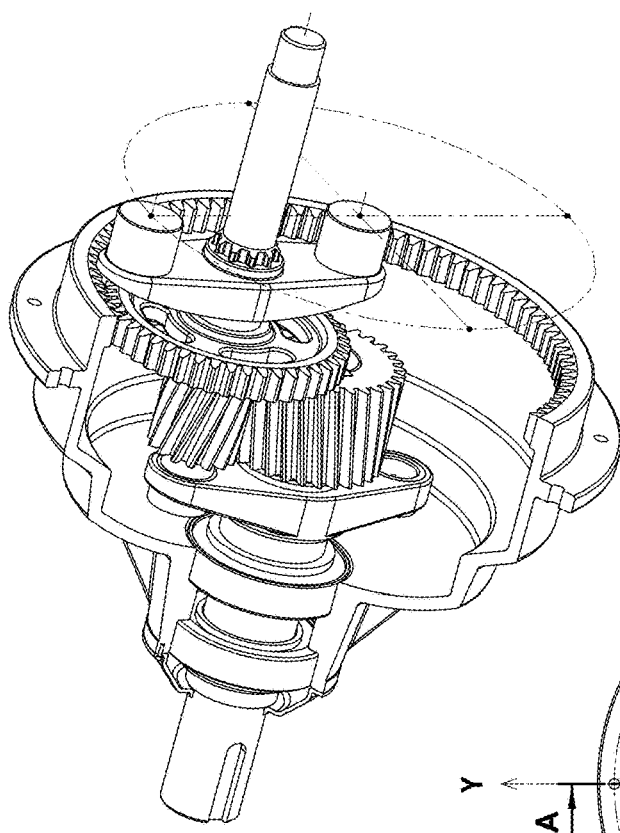
Figure 18:
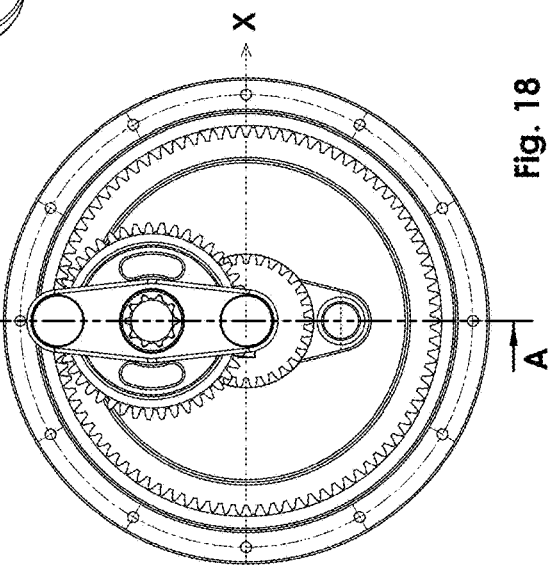
Figure 17:
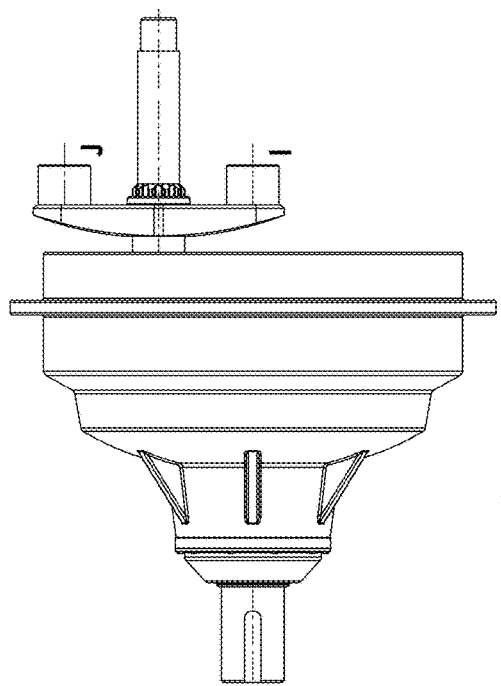
Figure 19:
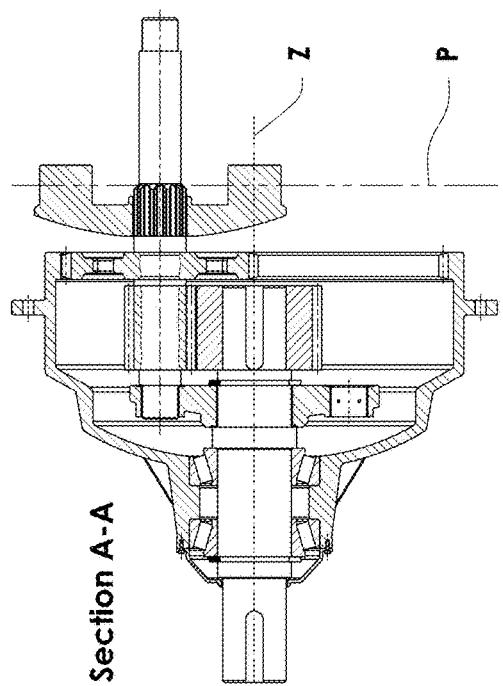
Figure 20:
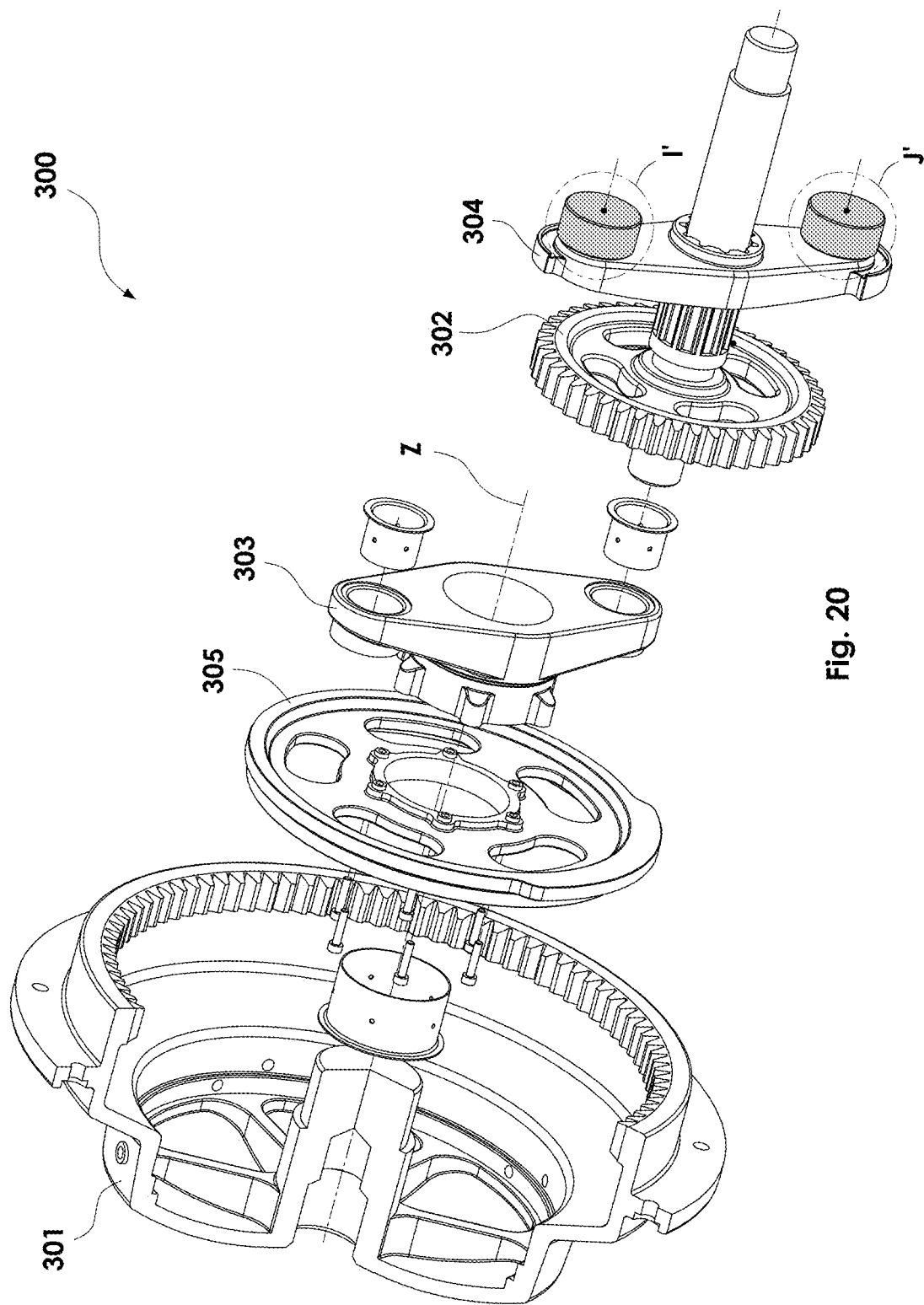
Figure 21:
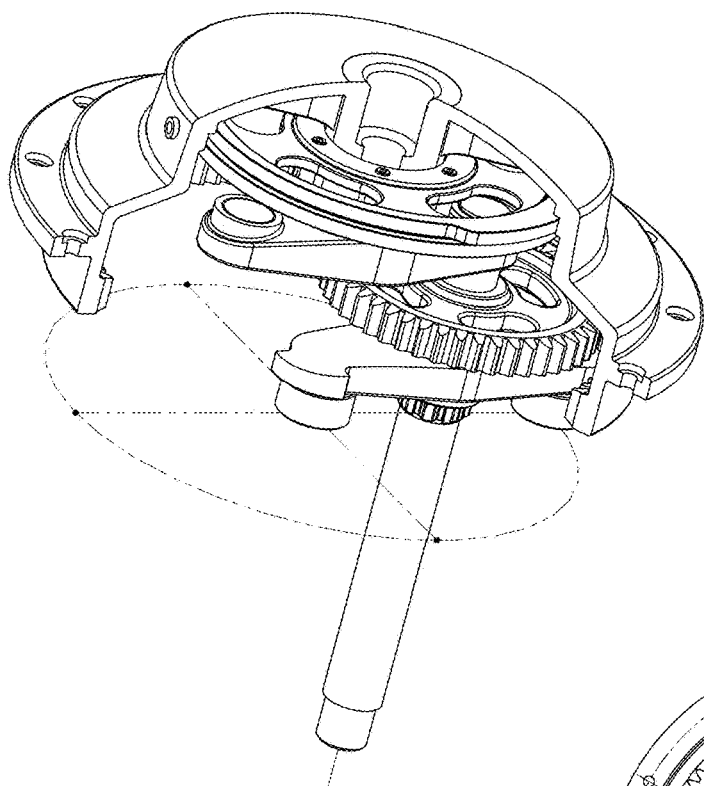
Figure 23:
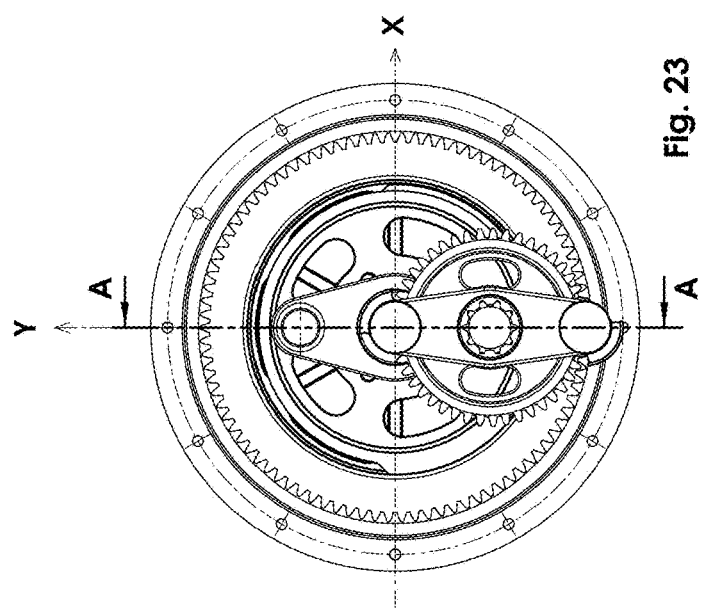
Figure 22:
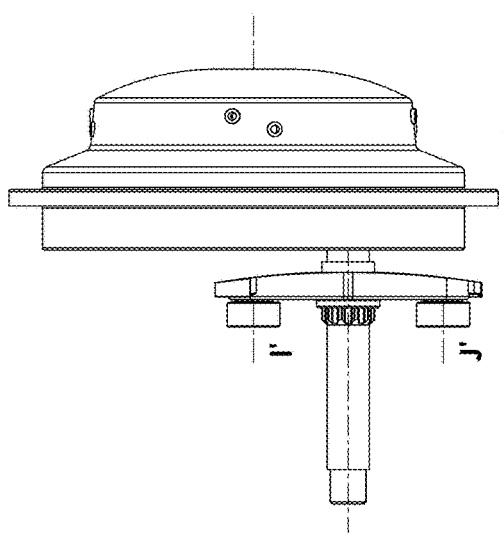
Figure 24:
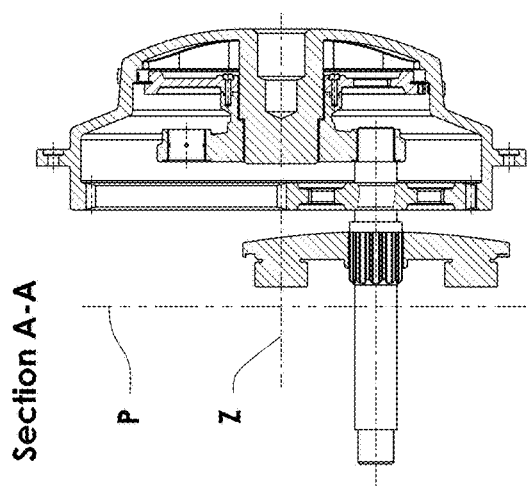
Figure 25:
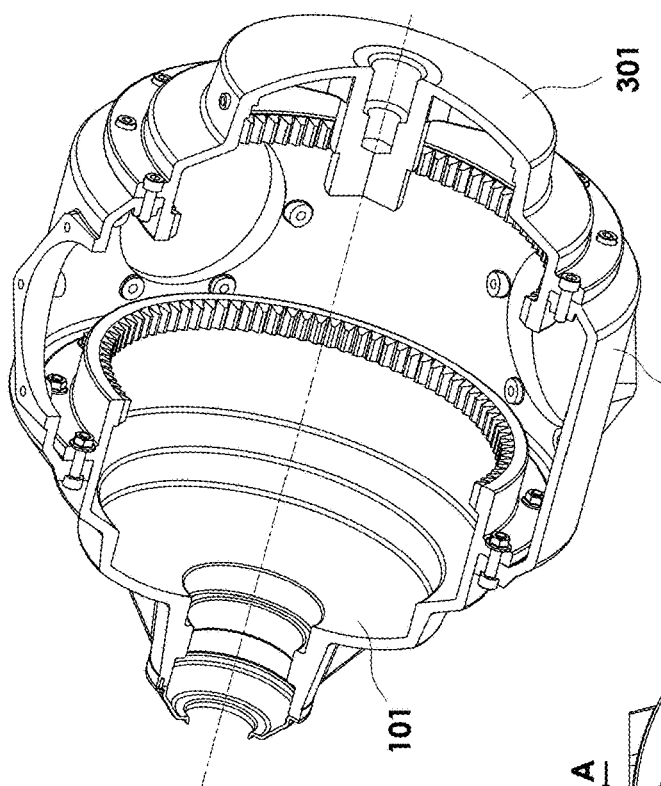
Figure 27:
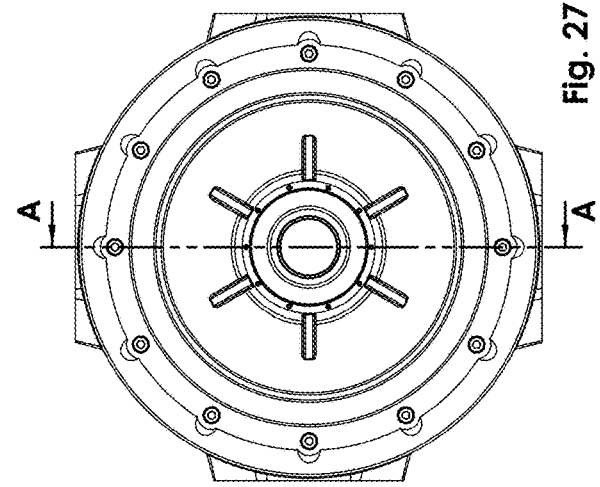
Figure 26:
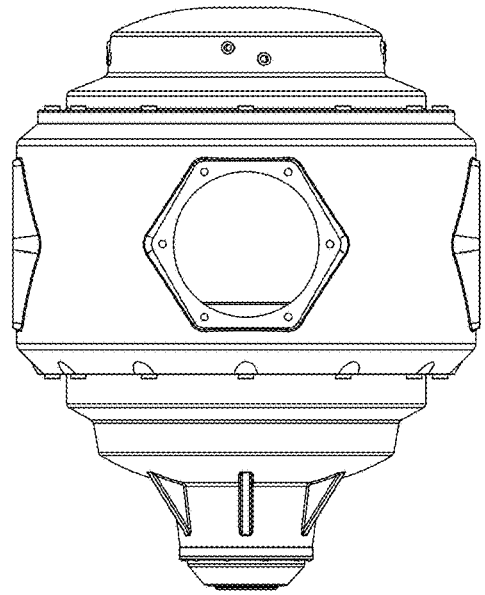
Figure 28:
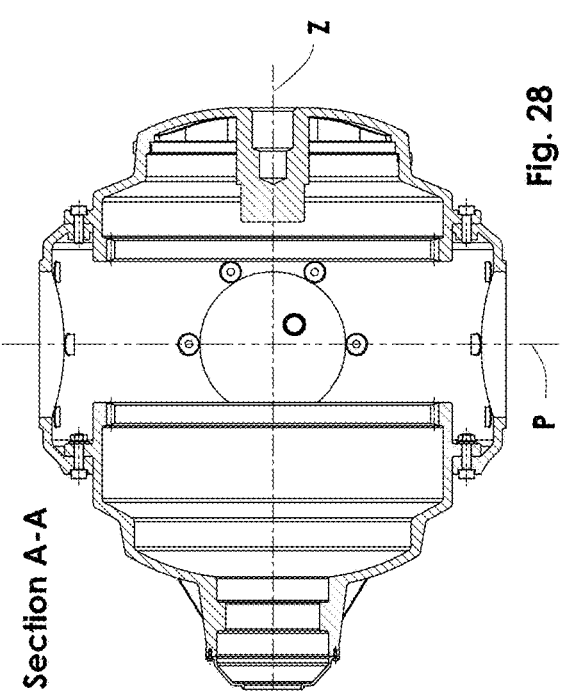
Figure 29:
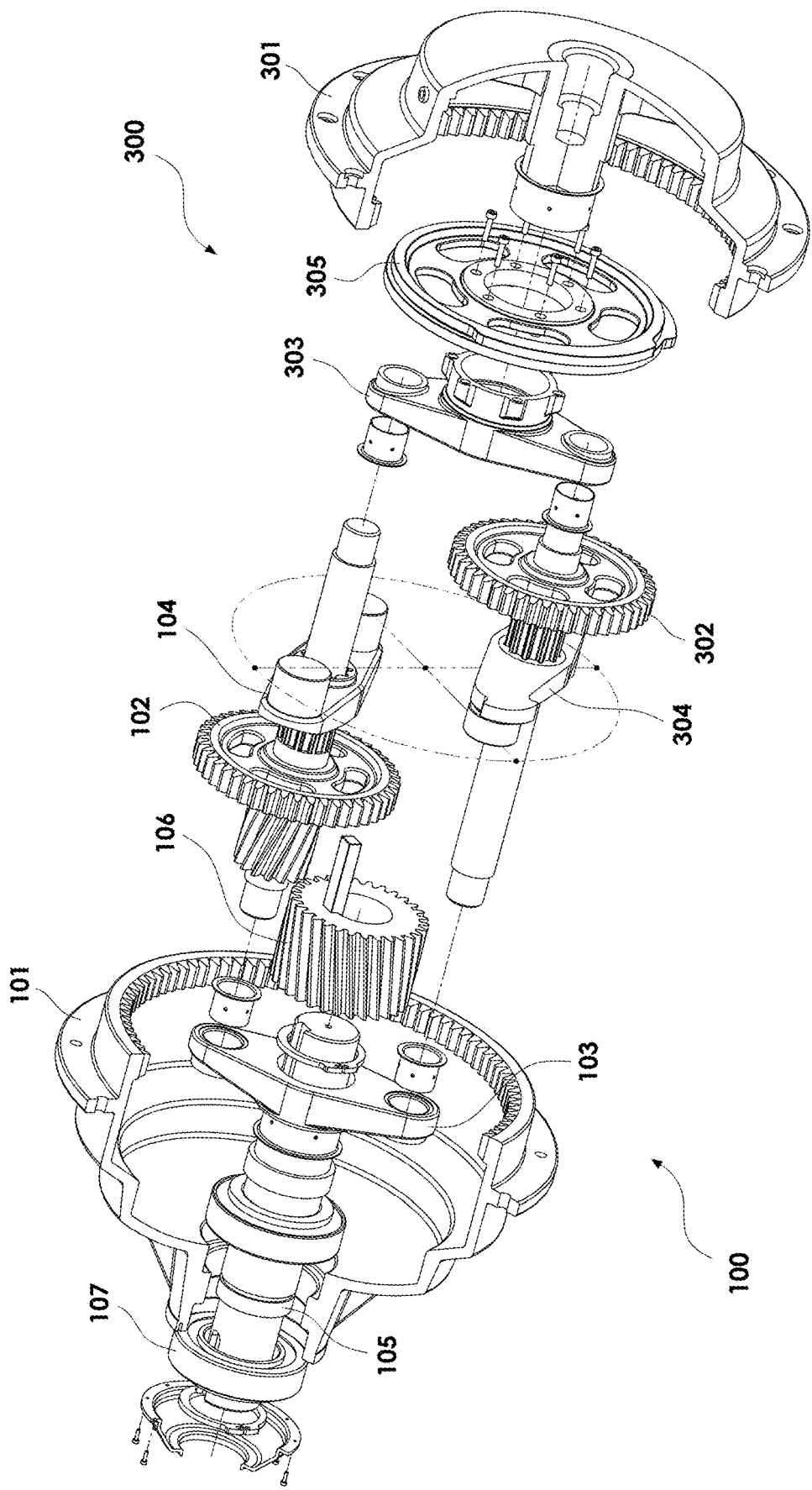
Figure 30:
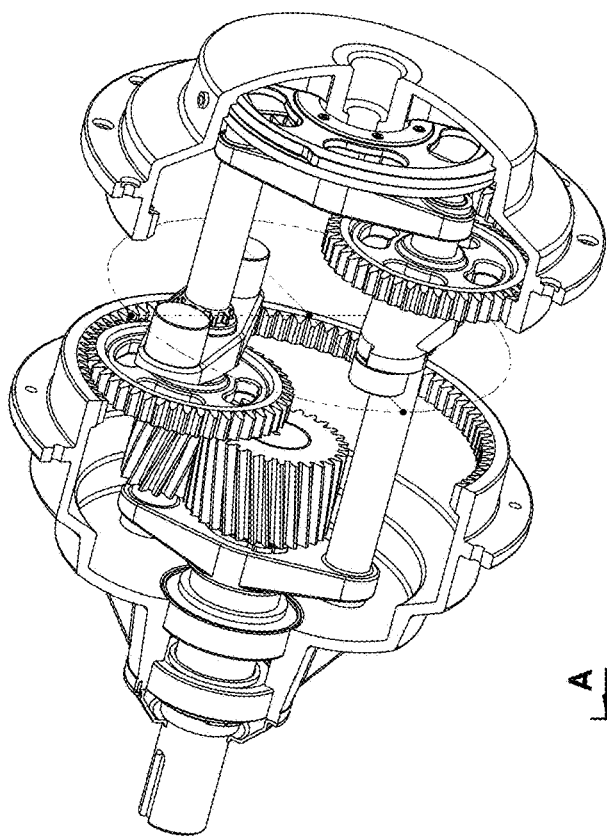
Figure 32:
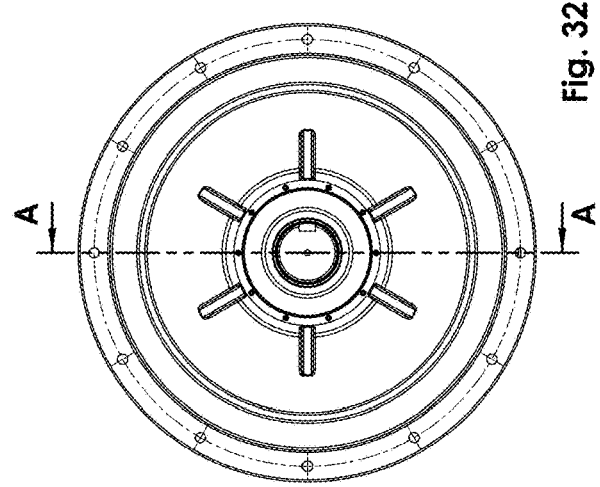
Figure 31:
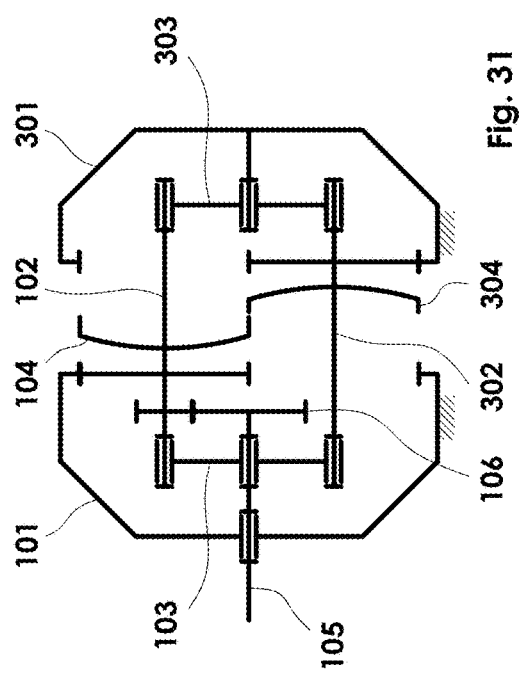
Figure 33:
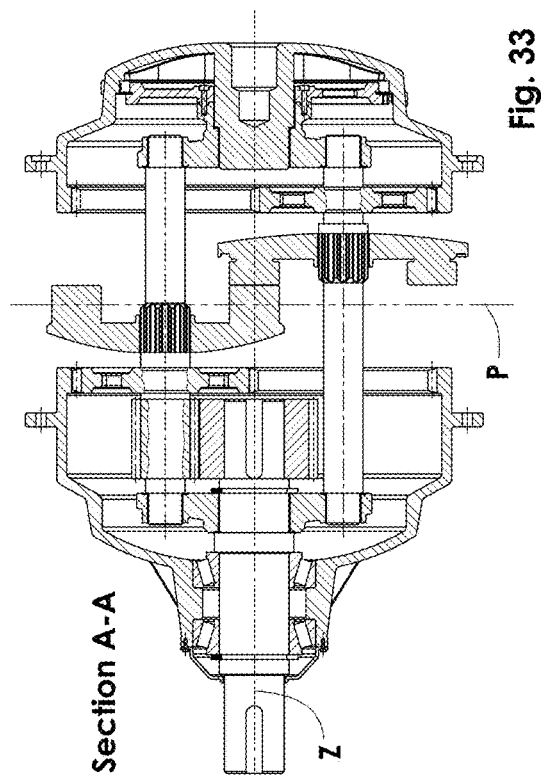
Figure 34:
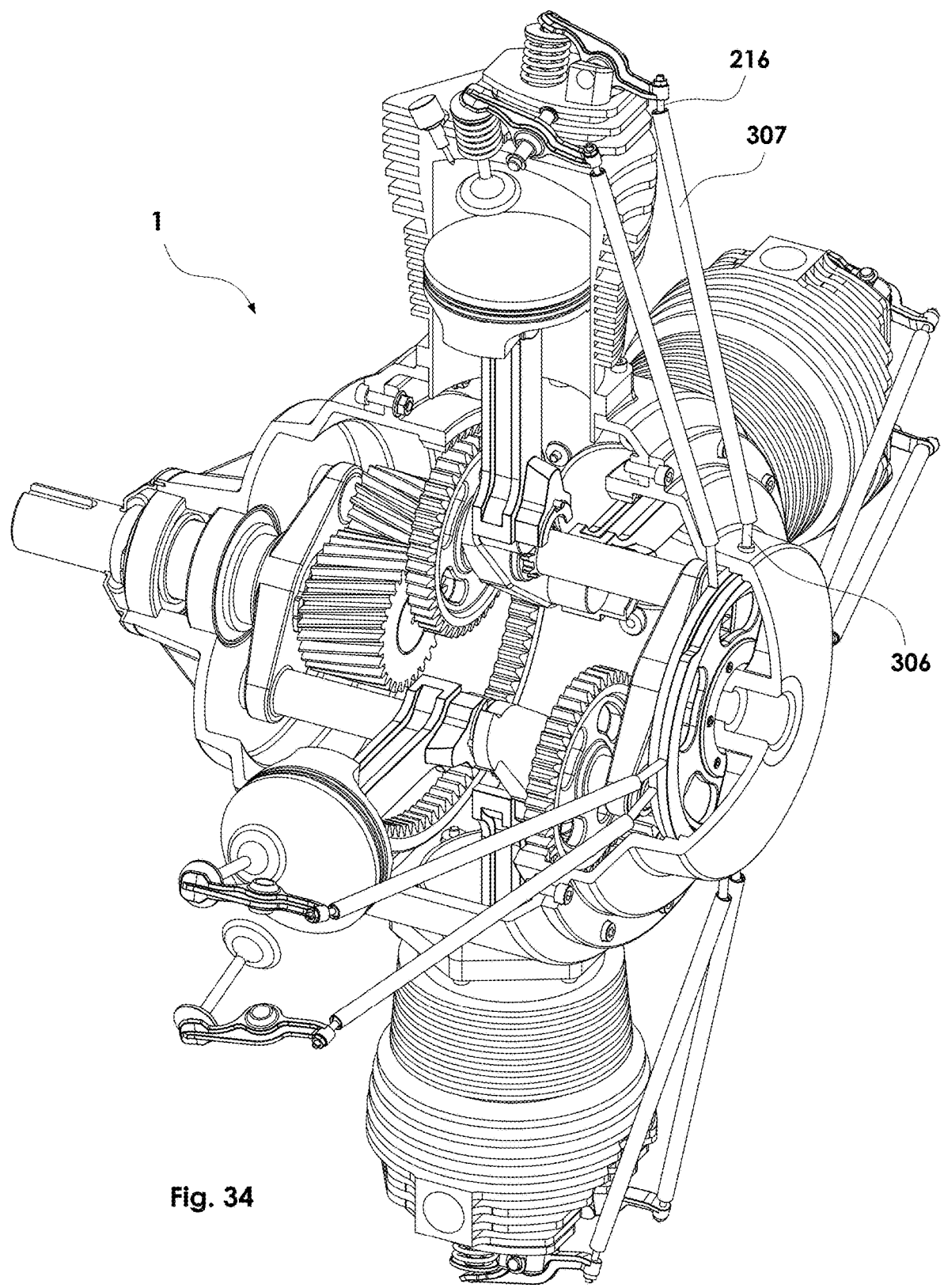
Figure 36:
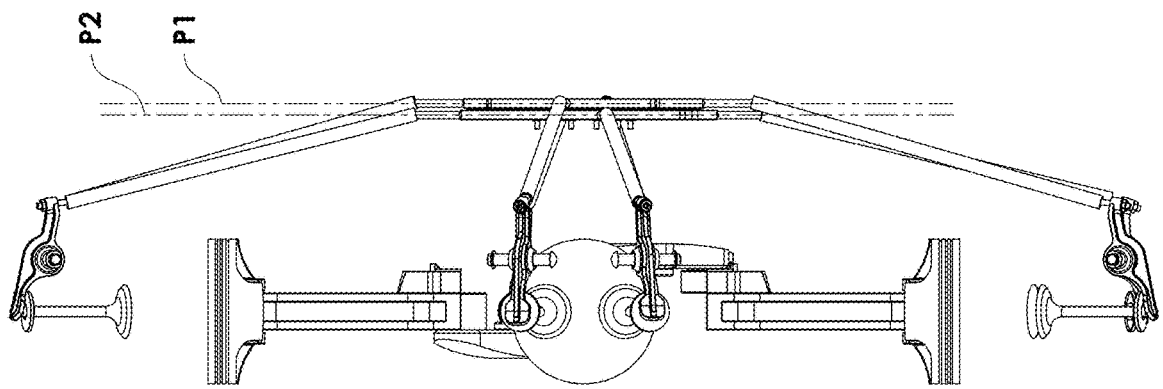
Figure 35:
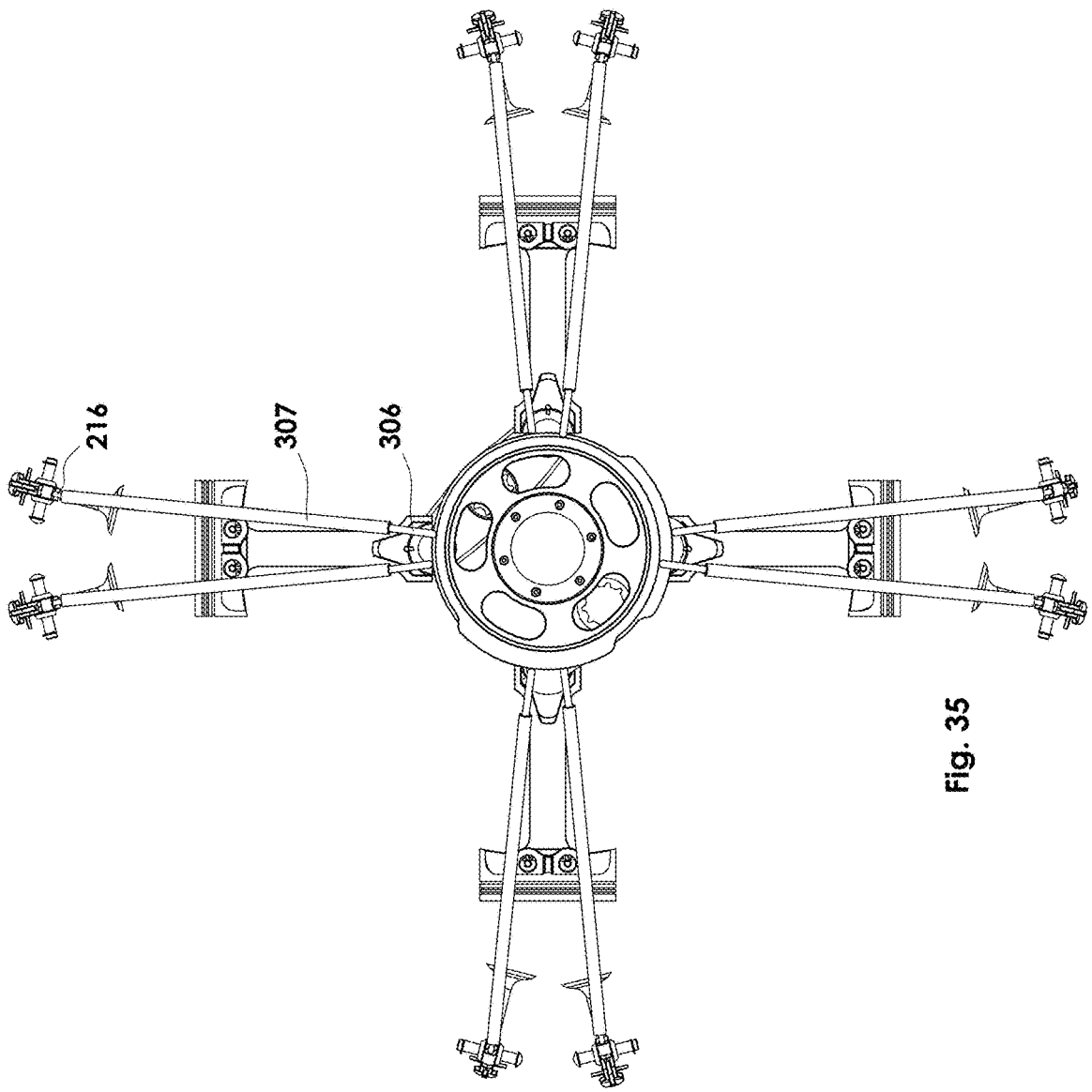
Figure 39:
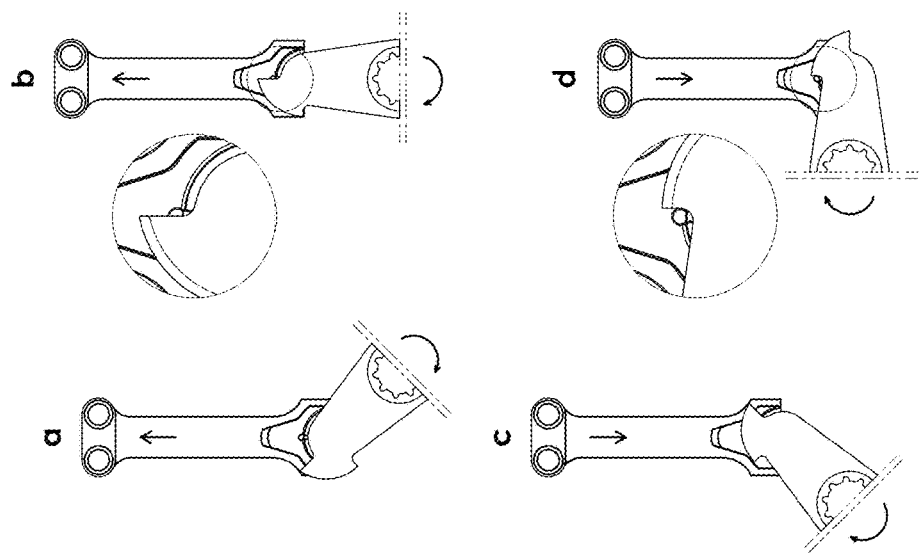
Figure 38:
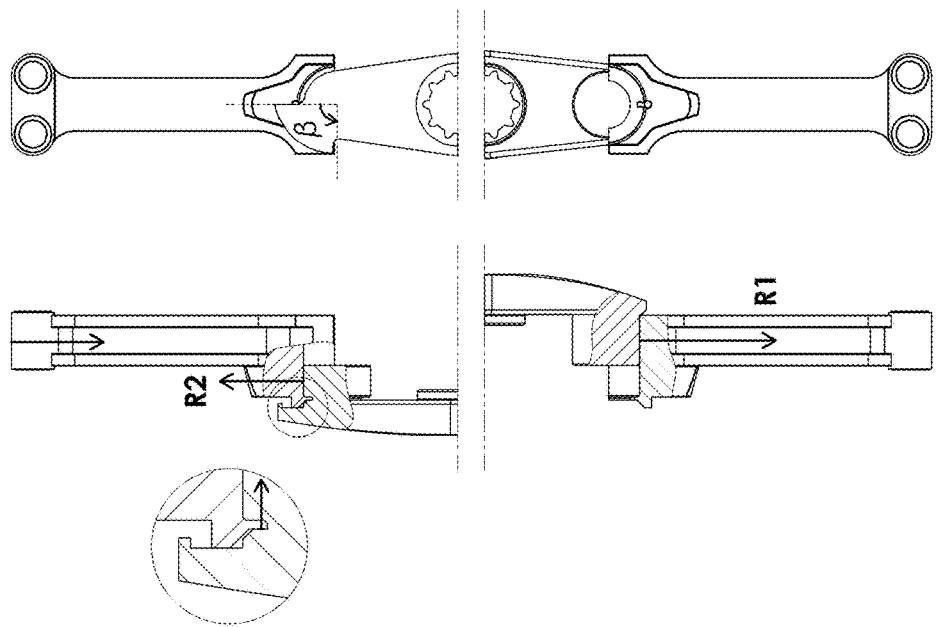
Figure 37:
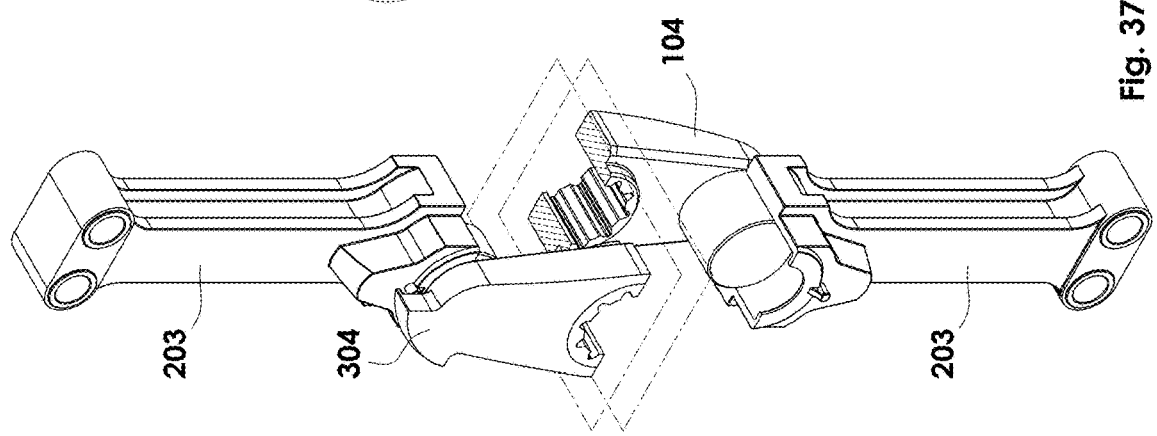
Figure 43:
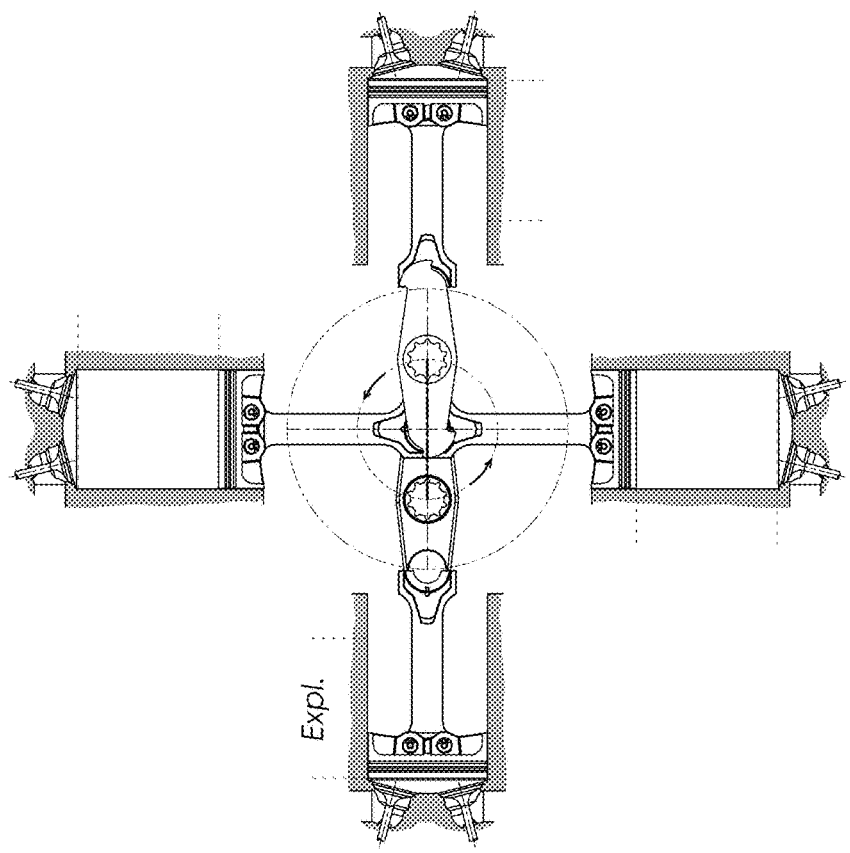
Figure 49:
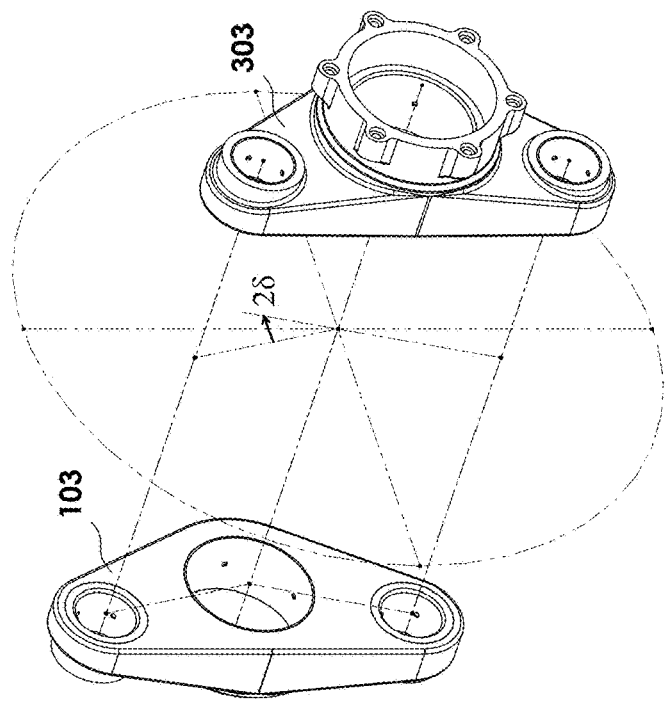
Figure 50:
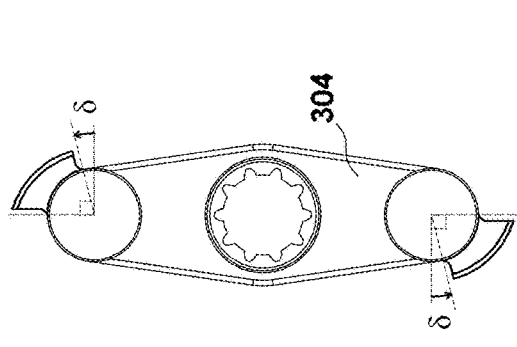
Figure 48:
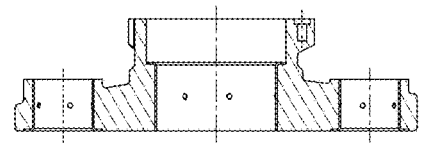
Figure 46:
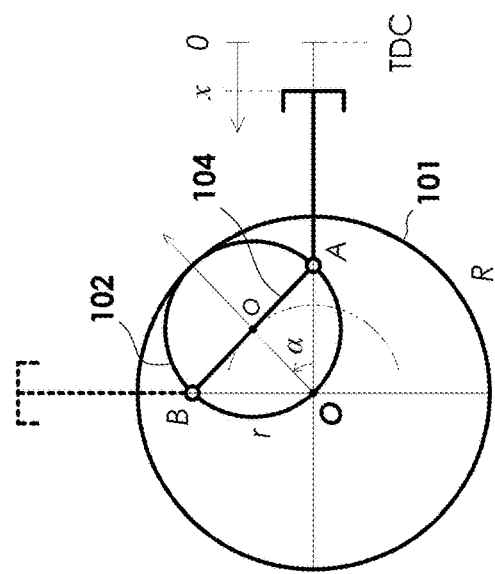
Figure 47:
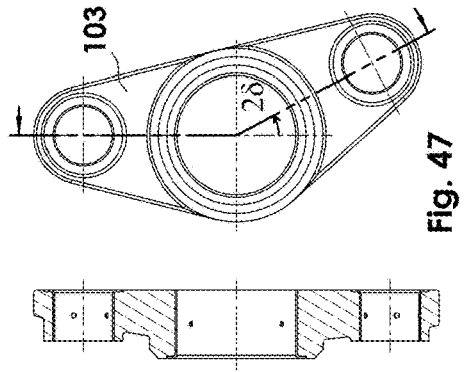
Figure 52:
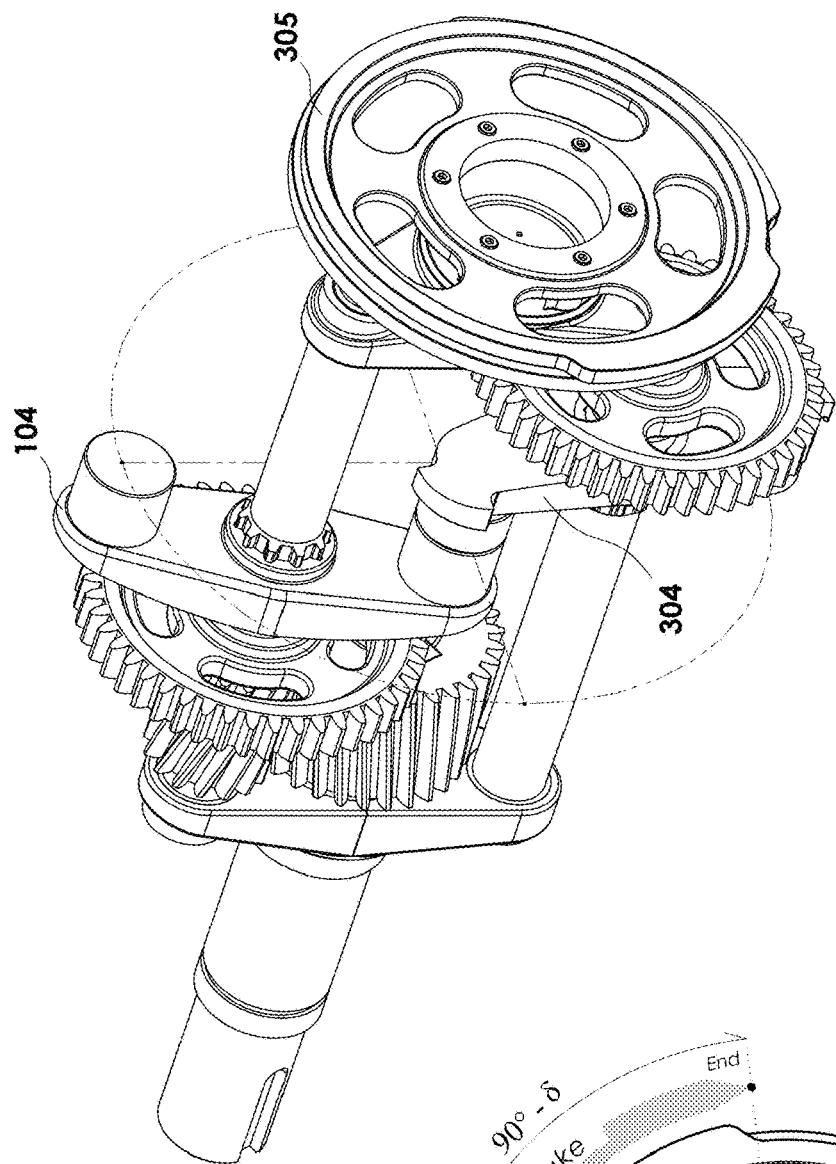
Figure 51:
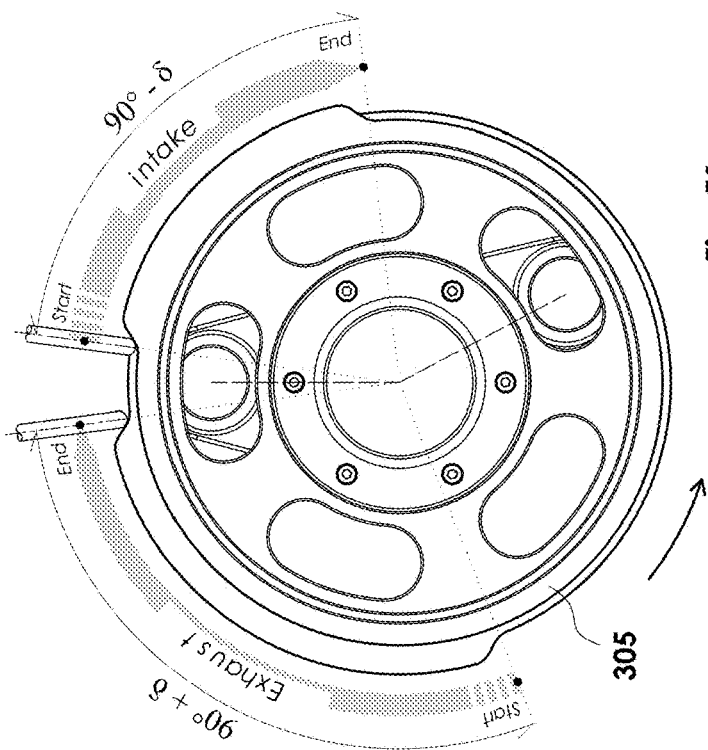
Figure 66:
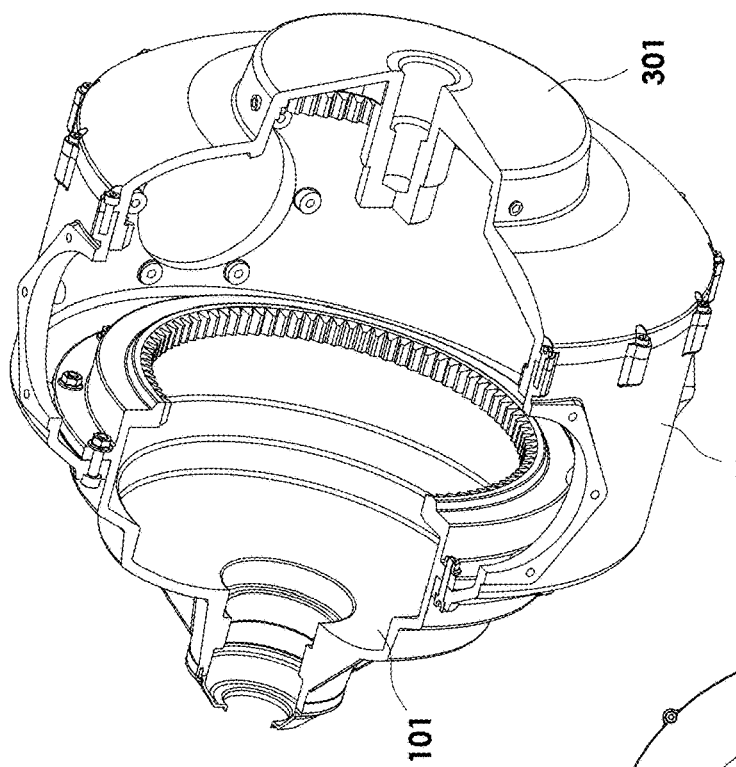
Figure 68:
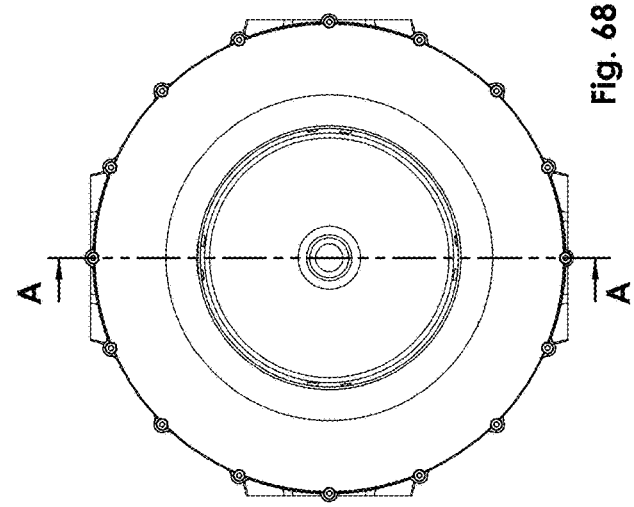
Figure 67:
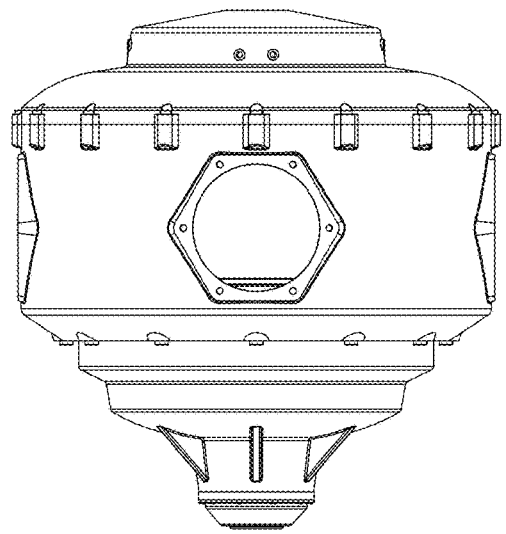
Figure 69:
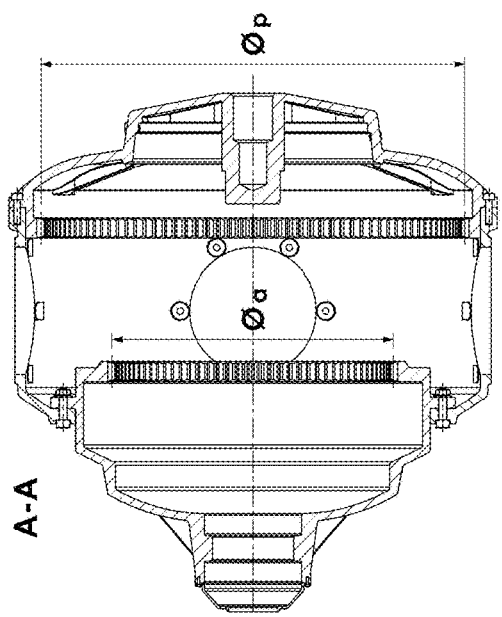
Figure 71:
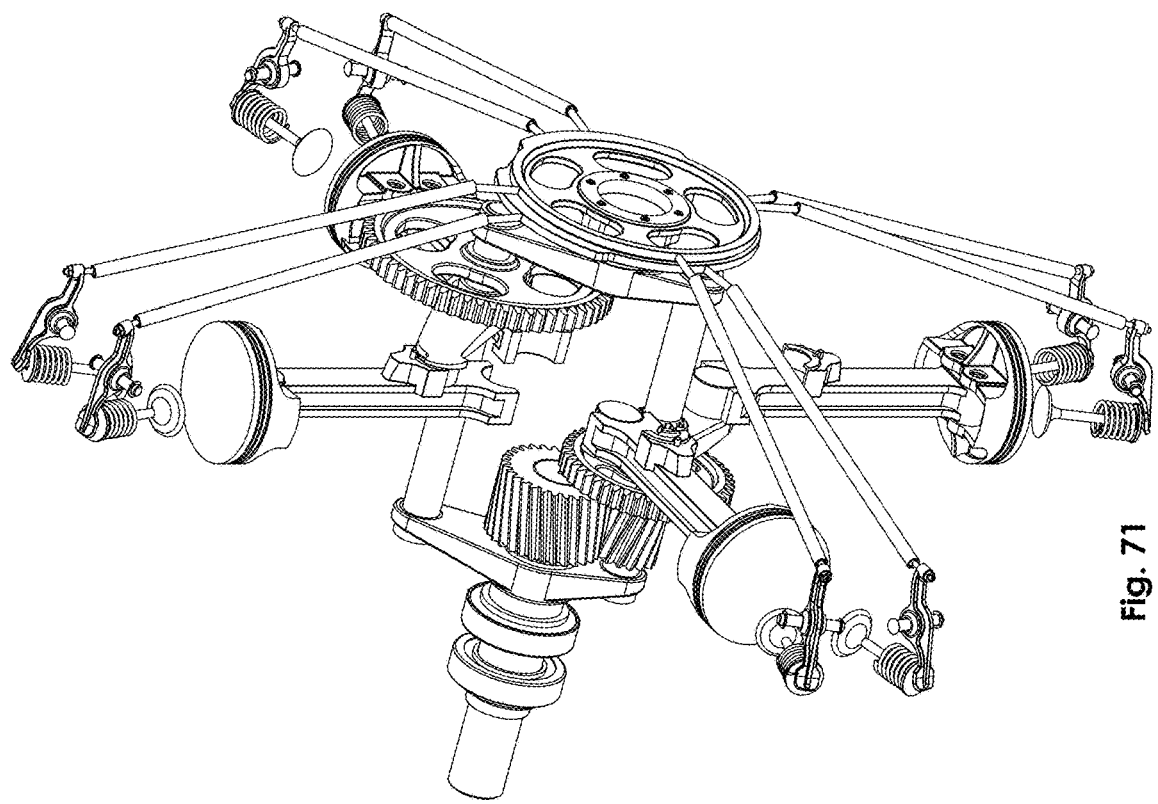
Figure 70:
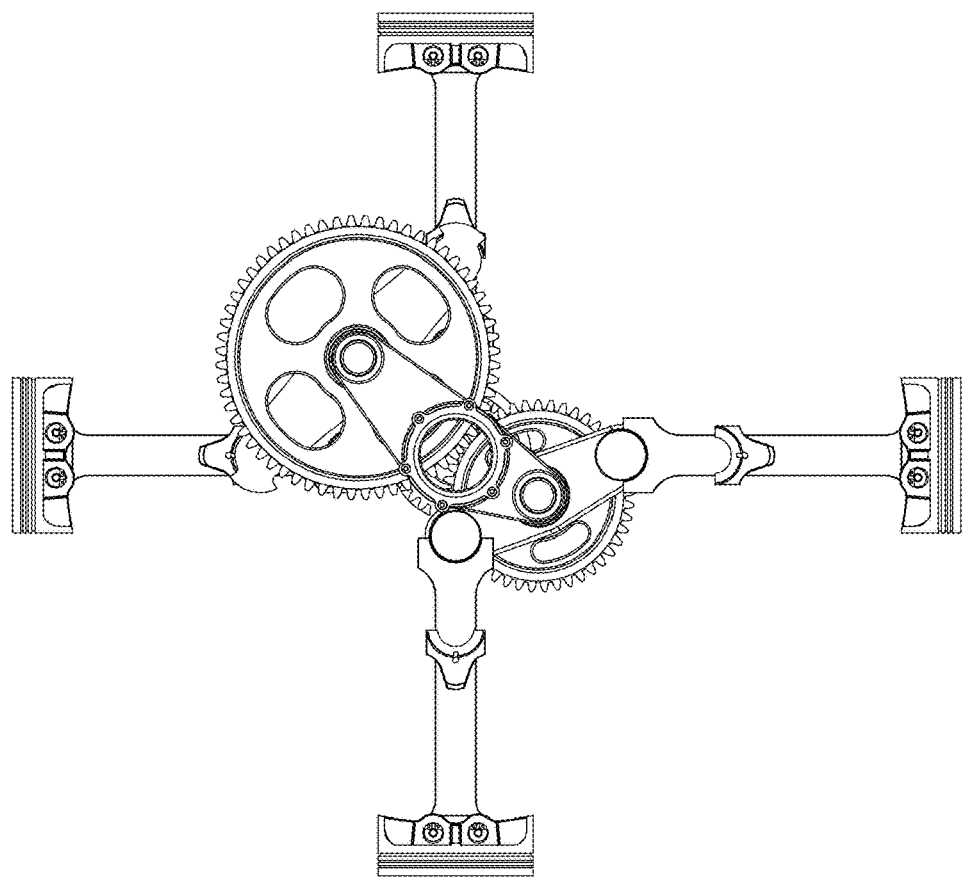
Figure 72:
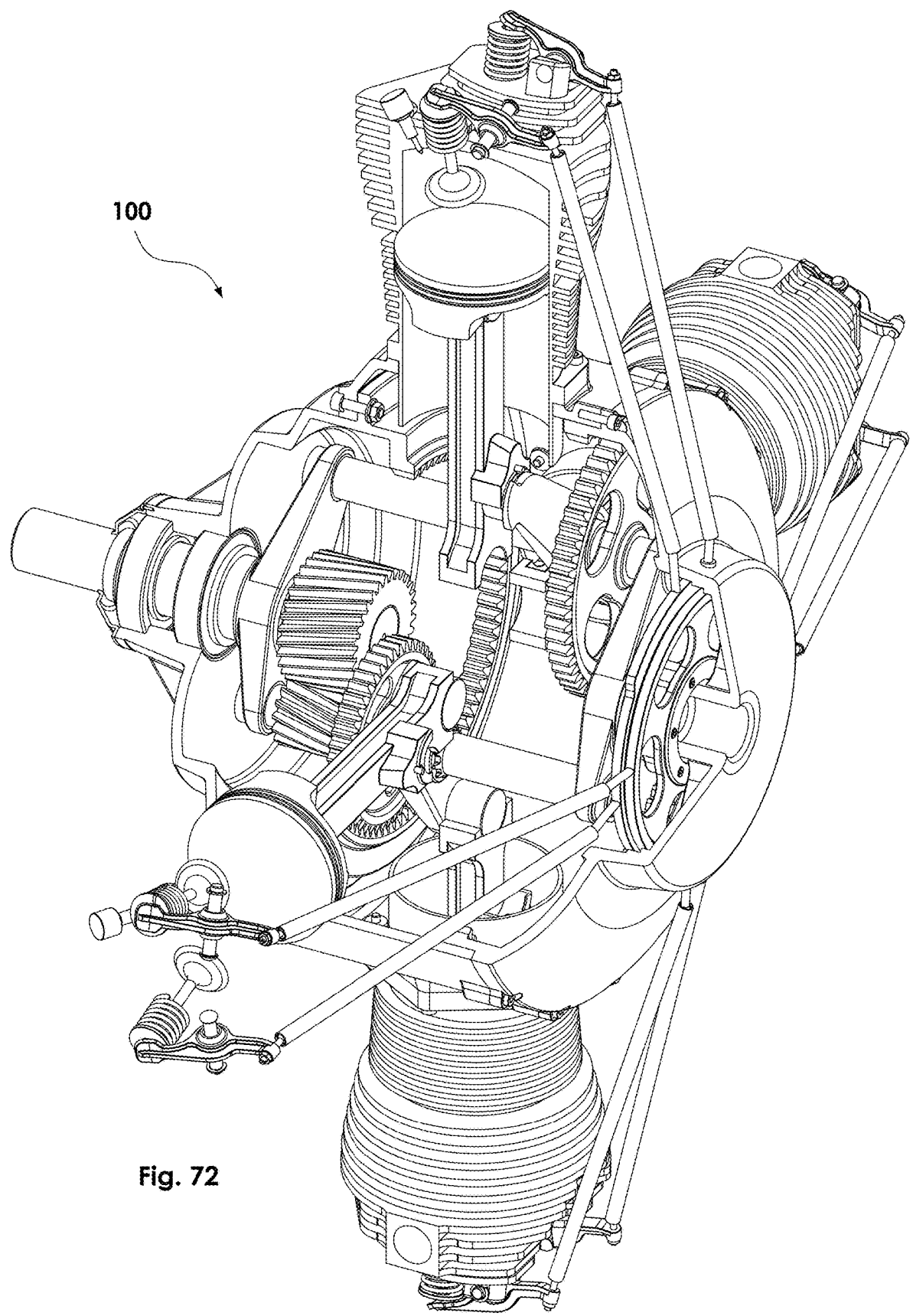
Figure 76:
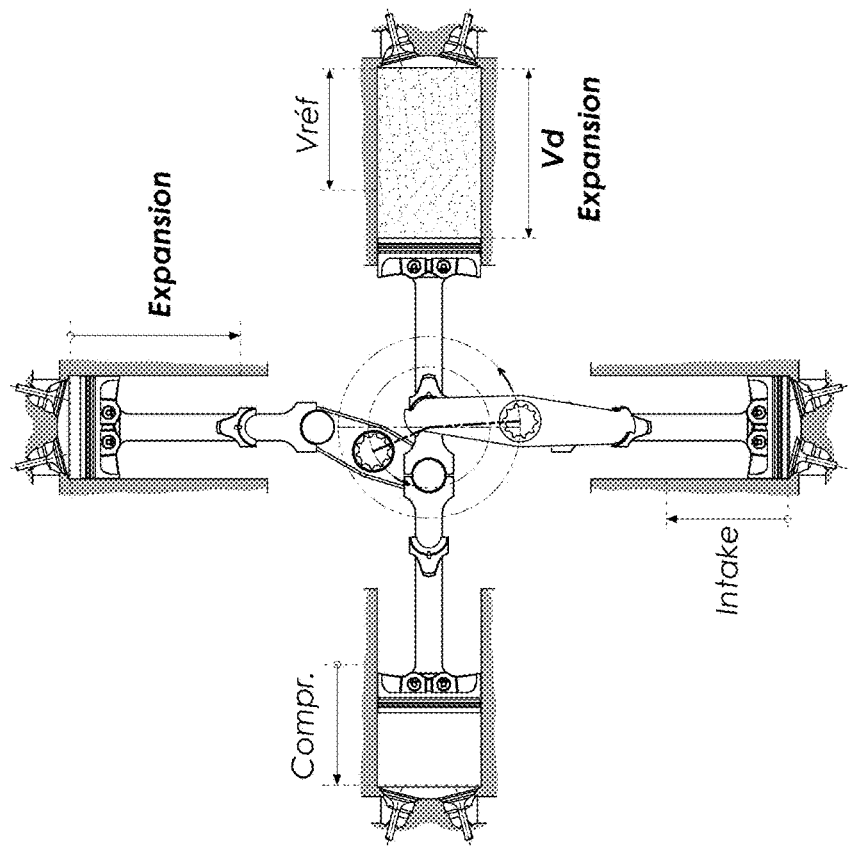
Figure 75:
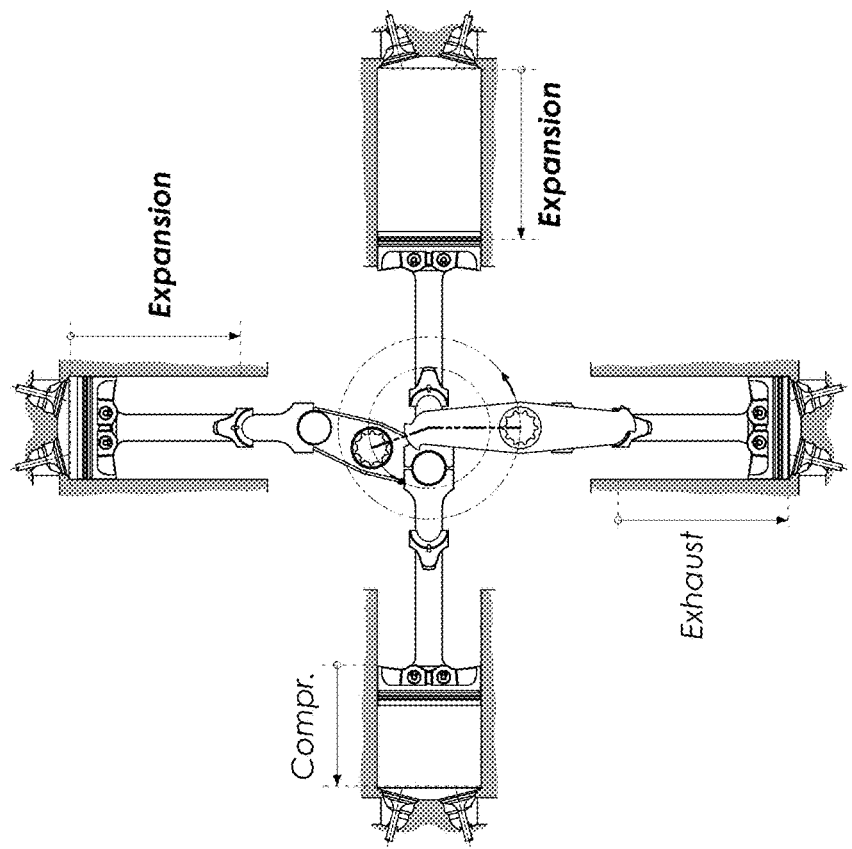
Figure 78:
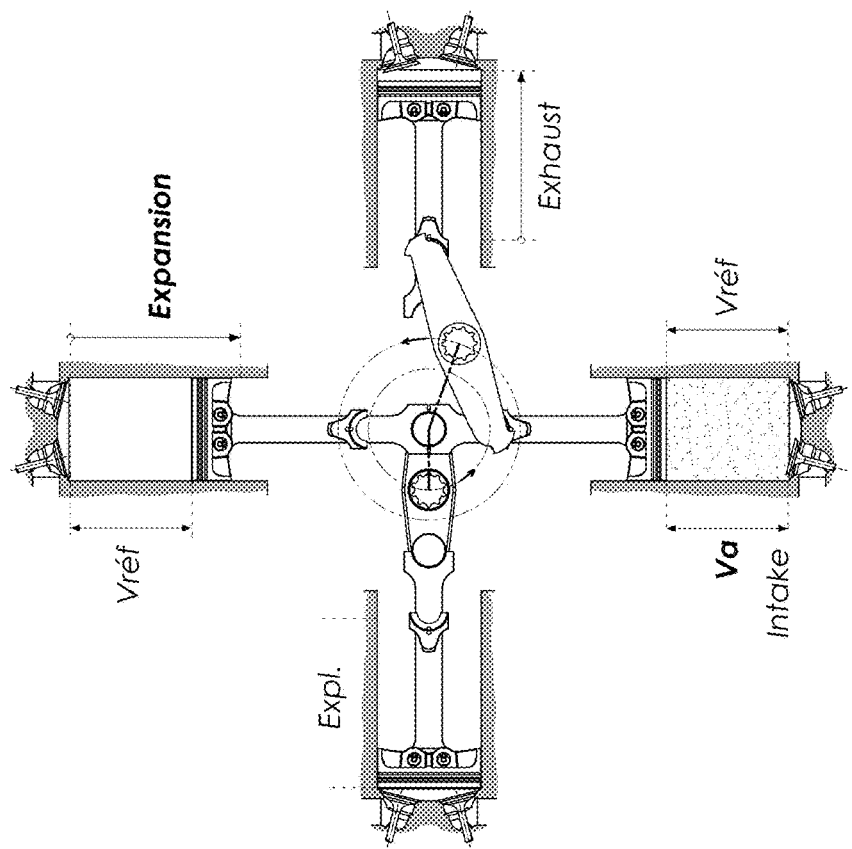
Figure 80:
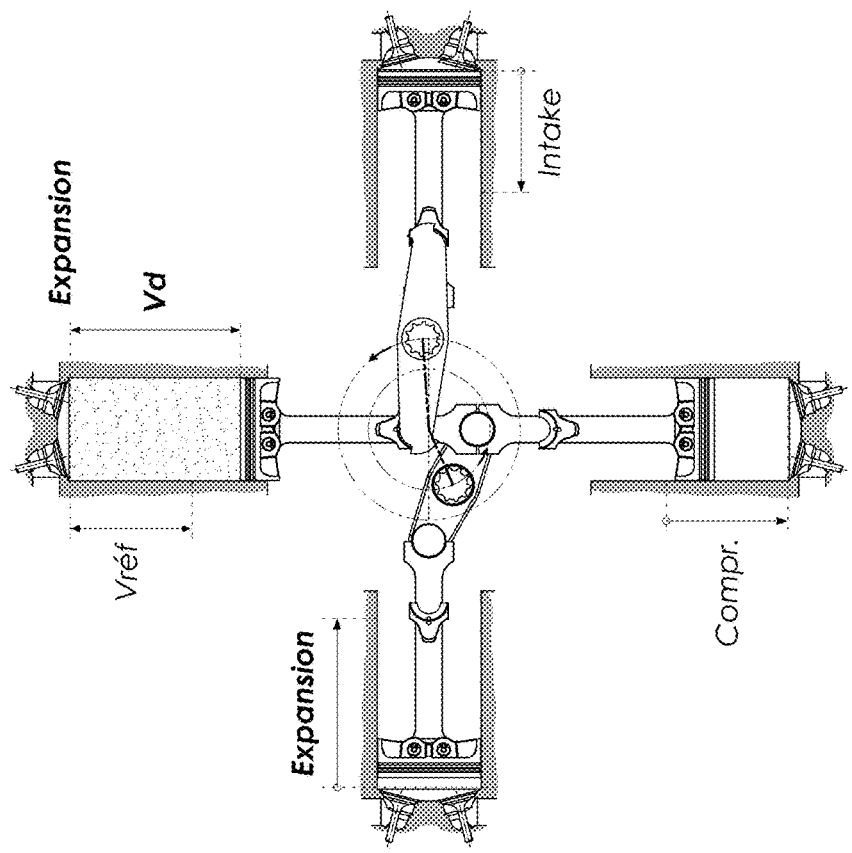
Figure 83:
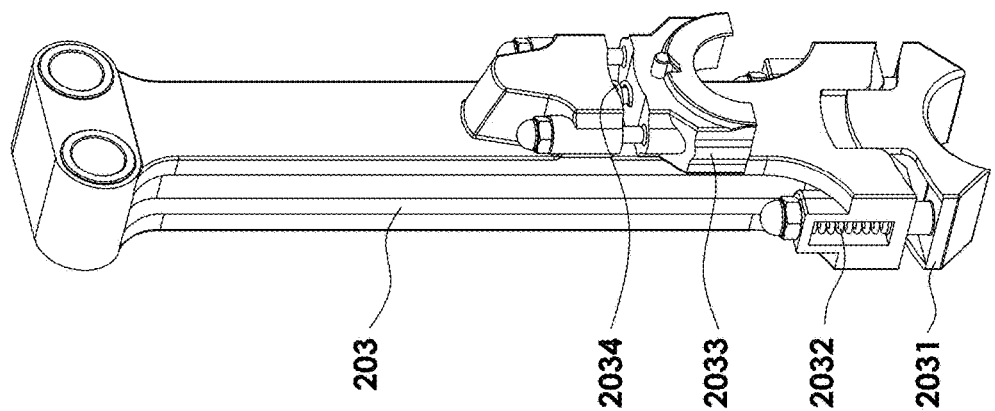
Figure 82:
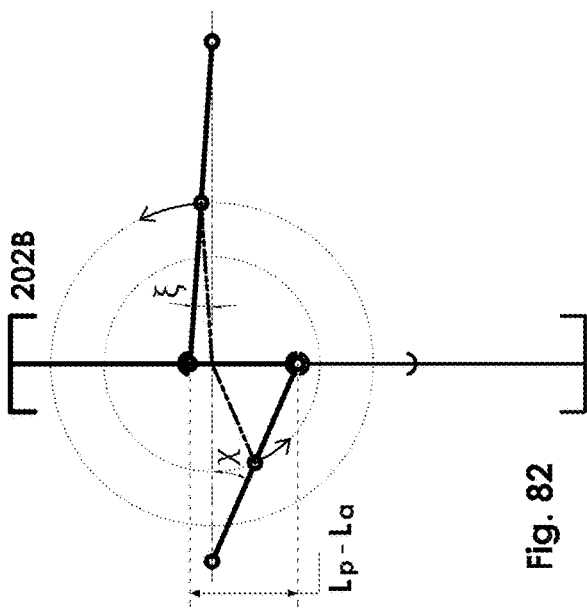
Figure 81:
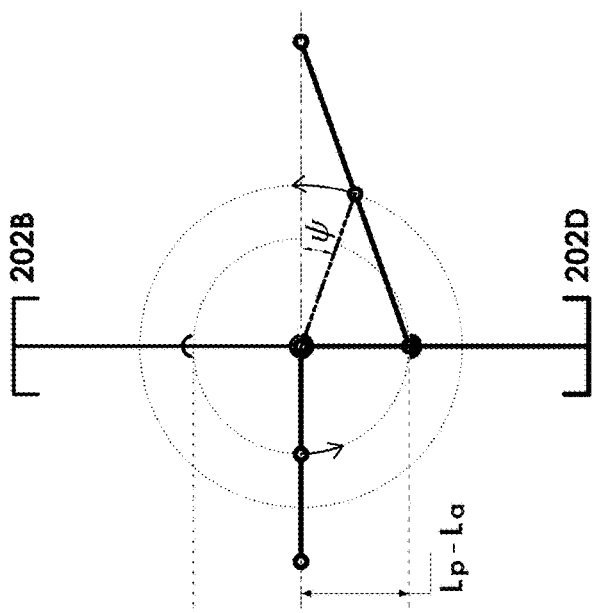
Figure 84:
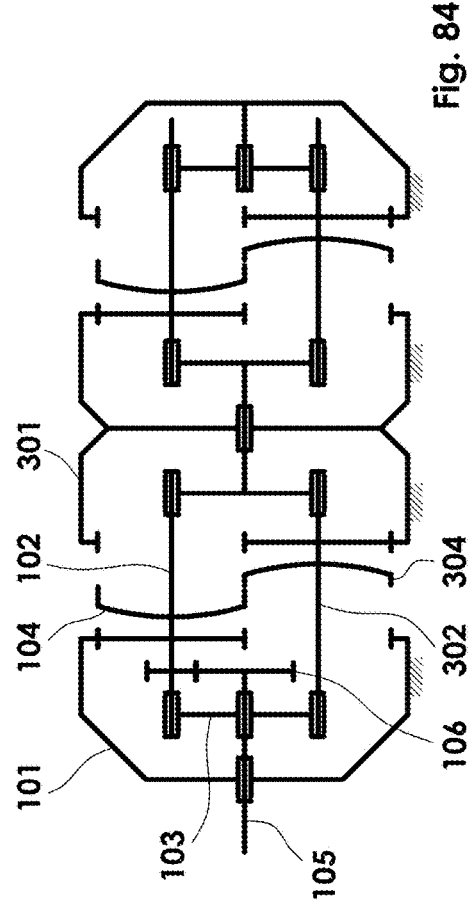

FIGS. 5, 6 et 7 show various views of the cylinder;

FIG. 8 shows a cross-sectional view of the cylinder;

FIG. 9 shows an exploded perspective view of the piston rigidly connected to its rod according to a preferred embodiment;

FIGS. 10, 11 and 12 show various views of the piston and its rod;

FIGS. 13 and 14 show various cross-sectional views of the piston and its rod;

FIG. 15 shows an exploded perspective view of the active unit according to a preferred embodiment, with a cross-section of 120° on the ring gear in order to highlight all of the hidden members;

FIG. 16 shows a perspective view of the active unit, with a cross-section of 120° on the ring gear and in order to highlight all of the hidden members;

FIGS. 17, 18 and 19 show various views and a cross-sectional view of the active unit by illustrating the positions of the main axes and of the main plane of the engine according to the invention;

FIG. 20 shows an exploded perspective view of the passive unit according to a preferred embodiment, with a cross-section of 120° on the ring gear in order to highlight all of the hidden members;

FIG. 21 shows a perspective view of the passive unit, with a cross-section of 120° on the ring gear and the cover in order to highlight all of the hidden members;

FIGS. 22, 23 and 24 show various views and a cross-sectional view of the passive unit by illustrating the positions of the main axes and of the main plane of the engine according to the invention;

FIG. 25 shows a perspective view of the ring gears of the active and passive units, each is rigidly connected to the collar of the cylinder block, according to one embodiment;

FIGS. 26, 27 and 28 show various views and a cross-sectional view of the ring gears of the active and passive units and of the collar of the cylinder block, by illustrating the position of the main plane;

FIG. 29 shows an exploded perspective view of the active and passive units, according to a preferred embodiment, highlighting their positioning with respect to the main axes;

FIG. 30 shows a perspective view of the active and passive units, with a cross-section of 120° on the ring gears in order to highlight all of the hidden members;

FIGS. 31, 32 and 33 respectively show the kinematic diagram, a view and a cross-sectional view of the active and passive units;

FIG. 34 shows a perspective view of the engine according to a first embodiment of the invention;

FIGS. 35 and 36 illustrate, according to one embodiment, the distribution system of the engine according to the invention;

FIGS. 37, 38 and 39 illustrate, according to one embodiment, the principle of interaction of the connecting rods of the active and passive units with the rod of the piston, in particular the operating principle of the hooking system intended to establish a connection between the connecting rod of the passive unit and said rod during intake;

FIGS. 40 to 45 illustrate the principle of the implementation of the four strokes of a cycle in the cylinders by the engine according to a first embodiment of the invention;

FIG. 46 shows a diagram of the system for transforming the movements of the pistons of the engine according to the invention;

FIGS. 47, 48 and 49 show cross-sectional and perspective views of the planet carriers of the active and passive units of the engine according to a second embodiment of the invention;

FIG. 50 shows the connecting rod of the passive unit of the engine according to said second embodiment of the invention;

FIG. 51 shows the radial cam of the engine according to said second embodiment of the invention;

FIG. 52 shows a perspective view illustrating the positioning of the mobile members of the active and passive units with respect to the main axes of the engine according to said second embodiment of the invention;

FIGS. 53 to 60 illustrate the principle of the implementation of the four strokes of a cycle in the cylinders by the engine according to said second embodiment of the invention;

FIG. 61 shows the rod of the piston of the engine according to a best embodiment of the invention, by highlighting the distance separating its first and its second supports;

FIG. 62 shows the connecting rod and the planet gear of the passive unit of the engine according to said best embodiment of the invention;

FIGS. 63, 64 show cross-sectional views of the planet carriers of the active and passive units of the engine according to said best embodiment of the invention;

FIG. 65 shows the radial cam of the engine according to said best embodiment of the invention;

FIG. 66 shows a perspective view of the ring gears of the active and passive units and of the collar of the cylinder block of the engine according to said best embodiment of the invention;

FIGS. 67, 68 and 69 show various views and a cross-sectional of the ring gears of the active and passive units and of the collar of the cylinder block, by highlighting the pitch diameters of said ring gears according to said best embodiment of the invention;

FIGS. 70 and 71 show front and perspective views of the mobile members of the engine according to said best embodiment of the invention;

FIG. 72 shows a perspective view of the engine according to said best embodiment of the invention;

FIGS. 73 to 80 illustrate the principle of the implementation of the four strokes of a cycle in the cylinders by the engine according to said best embodiment of the invention;

FIGS. 81 and 82 respectively show diagrams of FIGS. 78 and 80;

FIG. 83 shows a perspective view of the rod of the piston with a shock-absorber device according to one embodiment;

FIG. 84 shows the kinematic diagram of the coupling, according to one embodiment, of two engines according to the invention.

It is necessary to note that while the drawings disclose the invention in a detailed manner for its implementation, they can also be used to better define the invention if necessary. It is also understood that the embodiments of the invention illustrated by the drawings are given as a non-limiting example. Consequently, other embodiments according to other aspects of the engine according to the invention can be carried out, in particular by variations of the ratio of pitch diameters of the ring gears of the active and passive units and of the arrangement of the axes of the planet gears around the axis of the engine.

For more clarity, identical or similar elements are labelled by identical reference signs throughout the drawings.

V. DETAILED DESCRIPTION OF THE EMBODIMENTS OF THE INVENTION

The engine 1 according to the invention, via its architecture less constraining than that of the conventional crank connecting rod system, can be implemented according to various embodiments, each characterized by the following two parameters: the ratio of pitch diameters of the ring gears 101 and 301; and the arrangement of the axes of the planet gears 102 and 302 around the axis Z, the optimal choice of said parameters advantageously improves the performance of the engine 1 according to the invention in terms of efficiency and power in comparison to those of an engine with a crank and connecting rod with equivalent characteristics: identical stroke and bore.

Engine 1 According to a First Embodiment

According to a first embodiment of the invention, characterized in that the pitch diameters of the ring gears 101 and 301 are equal and in that the planet carriers 103 and 303 are configured in such a way that the axes of the planet gears 102 and 302 are symmetrical with respect to the axis Z of the engine 1.

Preferably, the first and the second supports of each of the rod 203 are coaxial, in such a way as to end up with a single TDC of the piston 202 at the end of compression and at the end of exhaust.

Preferably, the angular intervals of the intake and exhaust profiles of the radial cam 305 are identical and are at most equal to 90°.

Preferably, the angular interval of the hooking groove of the connecting rod 304 is at most equal to 90°.

Operating Principle of the Engine 1 According to the First Aspect and According to the First Embodiment:

The four strokes of the cycle occur in the cylinders 210, in a spontaneous manner, as illustrated by FIGS. 40 to 45 as follows:

FIG. 40: the cylinder 210A is the seat of the power stroke: expansion.

The expanding hot gases push the piston 202A from TDC towards the point BP which in turn pushes by means of its rod the crank pin I of the connecting rod 104, the active unit 100 is thus driven in rotation in the counterclockwise direction and consequently ensures the three other strokes of the cycle in the following manner:

The crank pin J pushes the piston 202B from the point BP towards TDC, compressing the air taken into the cylinder 210B (the intake and exhaust valves being closed)

The passive unit 300 being driven in rotation by the active unit 100, allowing by means of the connecting rod 304: on the one hand, to pull the piston 202C from TDC towards the point BP, via the hooking mechanism (connection being established), in order to ensure the suction of the air via the intake valve and on the other hand, to push by means of the crank pin J' the piston 202D from the point BP towards TDC, in order to release the burnt gases through the exhaust valve FIG. 41: The piston 202B reaches its top point at TDC at which the compression is maximum, the fuel is injected to produce the combustion.

The intake into the cylinder 210C is completed, the connecting rod 304 releases the rod of the piston 202C (connection released) at the point O and switches towards the rod of the piston 202A (at the end of expansion) to start the exhaust of the burnt gases, the exhaust valve opens.

The exhaust in the cylinder 210D is completed, the connecting rod 304 hooks onto the rod of the piston 202D in order to be able to subsequently ensure the suction.

The crank pin I of the connecting rod 104 leaves the rod of the piston 202A and switches towards the rod of the piston 202C at the point O to start the compression of the gases in the cylinder 210C, the intake valve closes.

Figure 42:
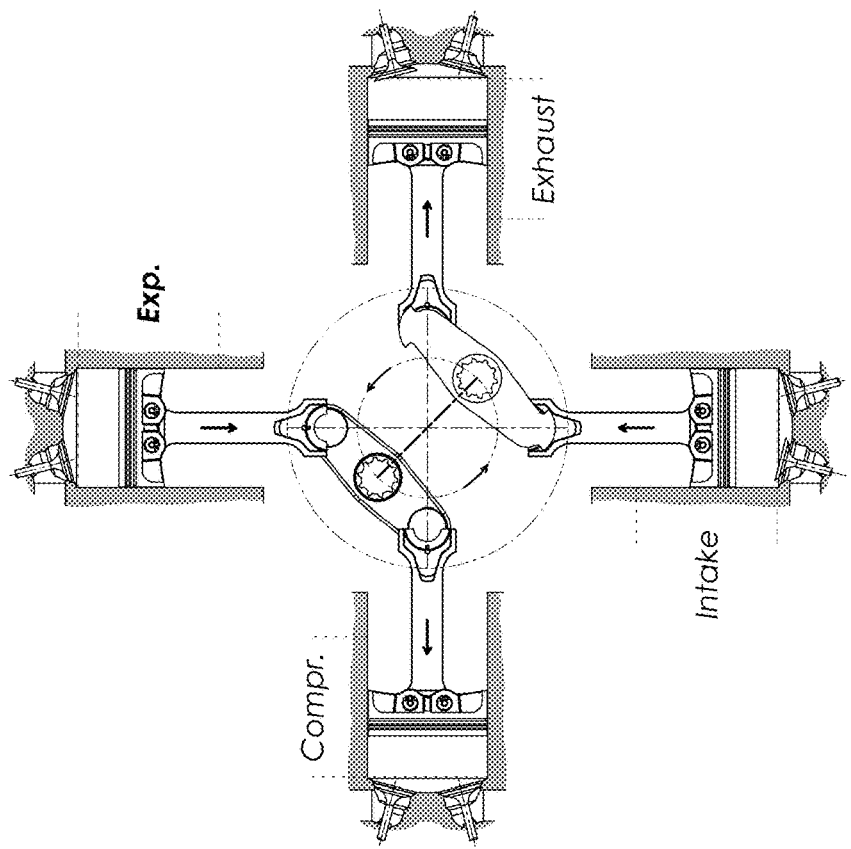
Figure 45:
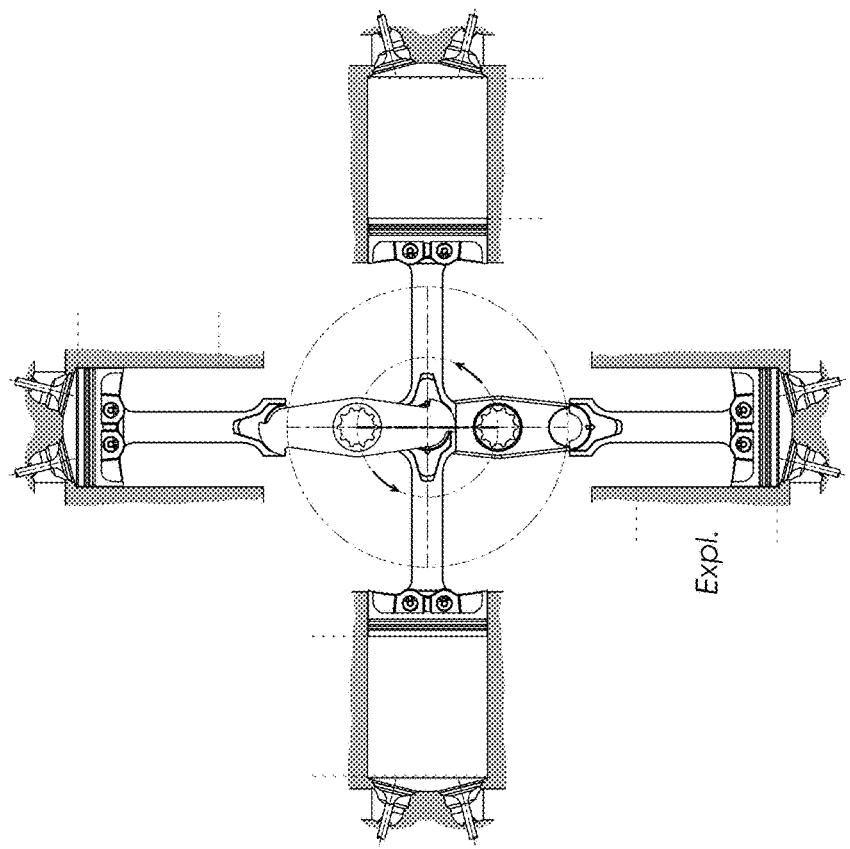
Figure 44:
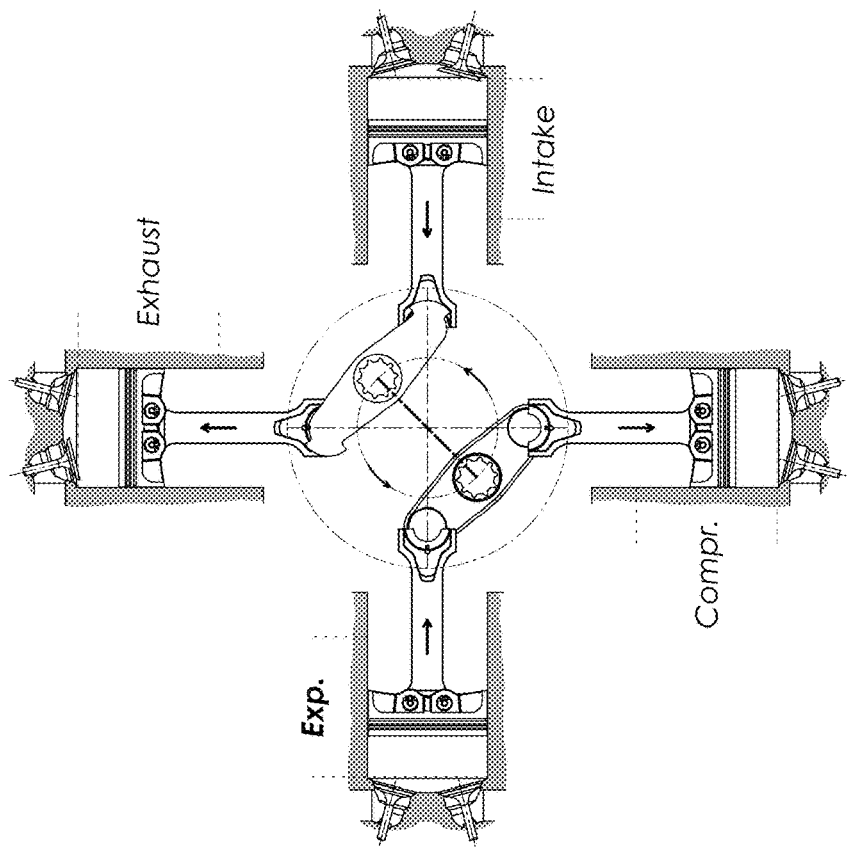

FIG. 42: Same description as FIG. 40, with:
Expansion in the cylinder 210B
Compression in the cylinder 210C
Intake in the cylinder 210D
Exhaust in the cylinder 210A
For FIGS. 43 to 45 which follow, the four strokes occur in the four cylinders 210 in the same manner as FIGS. 40 and 41 described above.

The following is noted based on the above operating principle:

- When the planet gear 102 carries out a rotation about the axis Z, the four strokes of the cycle occur in each of the four cylinders: 210A to 210D.
- The same starting point is reached after a rotation of the planet gear 102, a cycle that repeats itself autonomously is thus obtained.
- The power stroke (expansion) occurs in the four cylinders 210 according to the order A-B-C-D in the direction of rotation of the engine.
- The first and the second tipping points FTP and STP coincide with the point O.
- The stroke of each of the pistons is equal to the reference stroke.
- The volumes of compression and of expansion are identical and are equal to the reference volume, noted as $V_{Réf}$, corresponding to the reference stroke.

Static Behavior:

The analysis of the static behavior of the engine 1 according to the invention, in particular, that of the relationship linking the stress applied to the piston 202 and the torque available on the output shaft 105 according to its angle of rotation, allows to highlight the advantages that the engine 1 presents in terms of performance, via its system for transforming movements that offers wide mechanical flexibility in comparison to the conventional one with a crank and connecting rod, used in the majority of internal combustion engines at present.

The simplified relationship giving the torque, noted as $C_s$, available at the output shaft according to the resultant, noted as $F_p$, of the stresses applied onto the piston by the gaseous system during the power stroke is obtained from the equality of the powers consumed and provided $F_p \cdot V = C_s \cdot \omega$, by considering that the efficiency is equal to 1, that the output shaft rotates at a constant speed $\omega$ and that the inertias of the parts are negligible, where V is the speed of movement of the piston in the cylinder.

FIG. 46 illustrates a graphic representation of the system for transforming the movements of the engine 1 according to the invention, it is considered that this is a flat mechanism. The first toothing of the planet gear 102 having a pitch radius r rolls without sliding inside the ring gear 101 having a pitch radius R=2r. The geometry according to illustrative FIG. 46 is described by:

- The points A and B respectively designate the projections of the axes of the crank pins I and J of the connecting rod 104 on the main plane P,
- The segment [AB] represents the connecting rod 104
- The point o designates the projection of the axis of the planet gear 102 on the main plane P, the latter carries out a circular movement having a radius r around the point O
- α: designates the angular position of the point o with respect to the main axis X
- x: designates the position of the piston along the main axis X with respect to its TDC The focus is only on the two strokes of the cycle: compression and expansion, which corresponds to a half-rotation of the axis of the planet gear 102 about the axis Z. The values of α are thus comprised in the interval $[-\pi/2; \pi2]$. During these two strokes, the rod 203 being in permanent contact with the crank pin I is assimilated in a pivot connection with the connecting rod 104. The position of the piston according to the angle α is thus written:

$$x = 2r(1 - \cos\alpha)$$

Moreover, it can be noted that for a rotation of the axis of the planet gear 102 by a given angle α, the angular movement of the output shaft 105, designated by the angle θ, can take on several values, according to the transmission ratio of the gear composed of the second toothing of the planet gear 102 and of the sun gear 106. Indeed, when the axis of the planet gear 102 carries out a rotation by an angle α, the output shaft rotates in the same direction by an angle θ which is written as follows:

$$\theta = \alpha\left(1 + 2\frac{N_1}{N_2}\right)$$

$N_1$ and $N_2$ are respectively the numbers of teeth of the second toothing of the planet gear 102 and of the sun gear 106.

The value of said transmission ratio does not have an impact on the performance of the engine 1, the choice thereof is however determined only with the goal of having the same rotation at the output shaft as that obtained at the crankshaft of an engine with a crank and connecting rod when the piston travels one stroke, or a half-rotation.

Preferably, the pitch diameter of the sun gear 106 is equal to two times the pitch diameter of the second toothing of the planet gear 102 in such a way that when the piston 202 carries out a stroke of the cycle, which corresponds to a rotation of a quarter-turn of the axis of the planet gear 102, the output shaft 105 carries out a half-turn. As a result: $\theta = 2\alpha$ where $N_2 = 2N_1$. The movement x of the piston according to the angle of rotation θ of the output shaft for values comprised in the interval $[-\pi; \pi]$ is thus written as follows:

$$x = 2r\left(1 - \cos\frac{\theta}{2}\right)$$

The speed of movement of the piston V=ẋ according to the angle of rotation θ(t)=ωt, in the case of a rotation at constant speed, is thus obtained:

$$\dot{x} = r\,\omega\,\sin\frac{\theta}{2}$$

By replacing the expression of the speed V in the aforementioned equation of the powers consumed and provided, the following is obtained:

$$C_s = F_p\,r\,\sin\frac{\theta}{2}$$

It is noted according to the above relationship that: in the same way as a conventional engine with a crank and connecting rod, the torque $C_s$ available at the output shaft of the engine 1 according to the invention is cancelled out when the piston is at the top dead center TDC (at the end of compression) which corresponds to the value of θ=0, the action of the stress $F_p$ does not have an effect on the rotation of the output shaft since the lever arm is null. In practice, this problem is solved by providing a flywheel to ensure the passing of TDC at the end of compression.

Nevertheless, contrary to the conventional engine with a crank and connecting rod, at the point BP which corresponds to the value of θ=π, the torque $C_s$ available at the output shaft of the engine 1 according to the invention is not only non-zero, but also the lever arm of the stress $F_p$ reaches its maximum value: $C_s=F_p r$.

In the case of the engine 1 according to the first embodiment, the compression volume is identical to the expansion volume, that being said that the energy stored in the gaseous system at the end of expansion is not entirely spent, indeed, the gases burnt in expansion still keep a residual quantity of energy to be provided to the piston because the pressure in the cylinder at the end of expansion remains greater than the atmospheric pressure. This residual energy is then transformed into kinetic energy of the gases upon opening of the exhaust valves. In practice, a part of said kinetic energy is recovered via a turbocharger that restores it by turbocharging the engine in order to improve its power.

Advantageously, the expansion volume is prolonged with respect to that of intake with a view to taking more advantage of the work provided by the expanding gaseous system, which amounts to lowering as much as possible the pressure at the end of expansion.

In the case of the engine 1 according to the invention, because the lever arm of the stress $F_p$ reaches its maximum value at the end of expansion, this quantity of residual energy can be directly recovered in the form of mechanical work, without resorting to a turbocharger, and of course with clearly better efficiency.

Engine 1 According to a Second Embodiment

According to the operating principle of the engine 1 according to the first embodiment described above, it can be noted that it is the connecting rod 304 that ends the power stroke via one of its crank pins, by switching towards the expanding piston at the point O to produce exhaust: see FIGS. 40 to 42. Thus, to provide the piston with a prolonged expansion and still maintain its interaction with the connecting rod 104 in order to take the most advantage of the work provided by the expanding gaseous system, it suffices to delay the switching of the connecting rod 304 towards the expanding piston beyond the point O.

To do this, it is proposed a second embodiment of the invention characterized in that the pitch diameters of the ring gears 101 and 301 are equal and in that the two planet carriers 103 and 303 are configured in such a way that the axes of the planet gears 102, 302 and the axis Z are not coplanar.

Preferably, the first and the second supports of each of the rod 203 are coaxial, in such a way as to end up with a single TDC of the piston 202 at the end of compression and at the end of exhaust.

Said arrangement of the axes of the two planet gears around the axis Z is obtained by asymmetric planet carriers 103 and 303, each characterized by an angular offset noted as 2δ as illustrated by FIGS. 47 to 49, which is carried out, by taking into account the direction of rotation of the engine, in such a way that the expansion stroke is prolonged, in other words, the expanding piston 202 continues to push, by means of its rod 203, the crank pin of the connecting rod 104 beyond the point O.

Nevertheless, the prolongation of the expansion volume is obtained to the detriment of its intake volume. Indeed, the connecting rod 304 releases the rod of a piston 202 early in intake phase at the tipping point FTP before reaching the point O, to come into contact with the rod of the opposite piston, which has completed a prolonged expansion beyond the point O, in order to start the exhaust of the burnt gases. As a result, the volume gained in expansion, noted as α, with respect to the reference volume $V_{Réf}$ is subtracted in return from the intake volume (see FIG. 55: piston 202D) so that their sum remains unchanged regardless of the prolongation ratio, the following is written:

$$V_a + V_d = 2\ V_{Réf} \text{ and } V_d = V_{Réf} + a$$

where $V_a$ and $V_d$ are respectively the intake and expansion volumes.

Given that the expansion volume increases and the intake volume decreases, the radial cam 305 of the engine 1 according to the second embodiment is provided with an exhaust profile prolonged by an angle δ and with an intake profile contracted by the same angle δ with respect to those in which the intake and expansion volumes are identical, as illustrated by FIG. 49.

From the same principle, the angular interval of the hooking groove of the connecting rod 304 is contracted by an angle δ: as illustrated by FIG. 50.

Figures 53, 54:
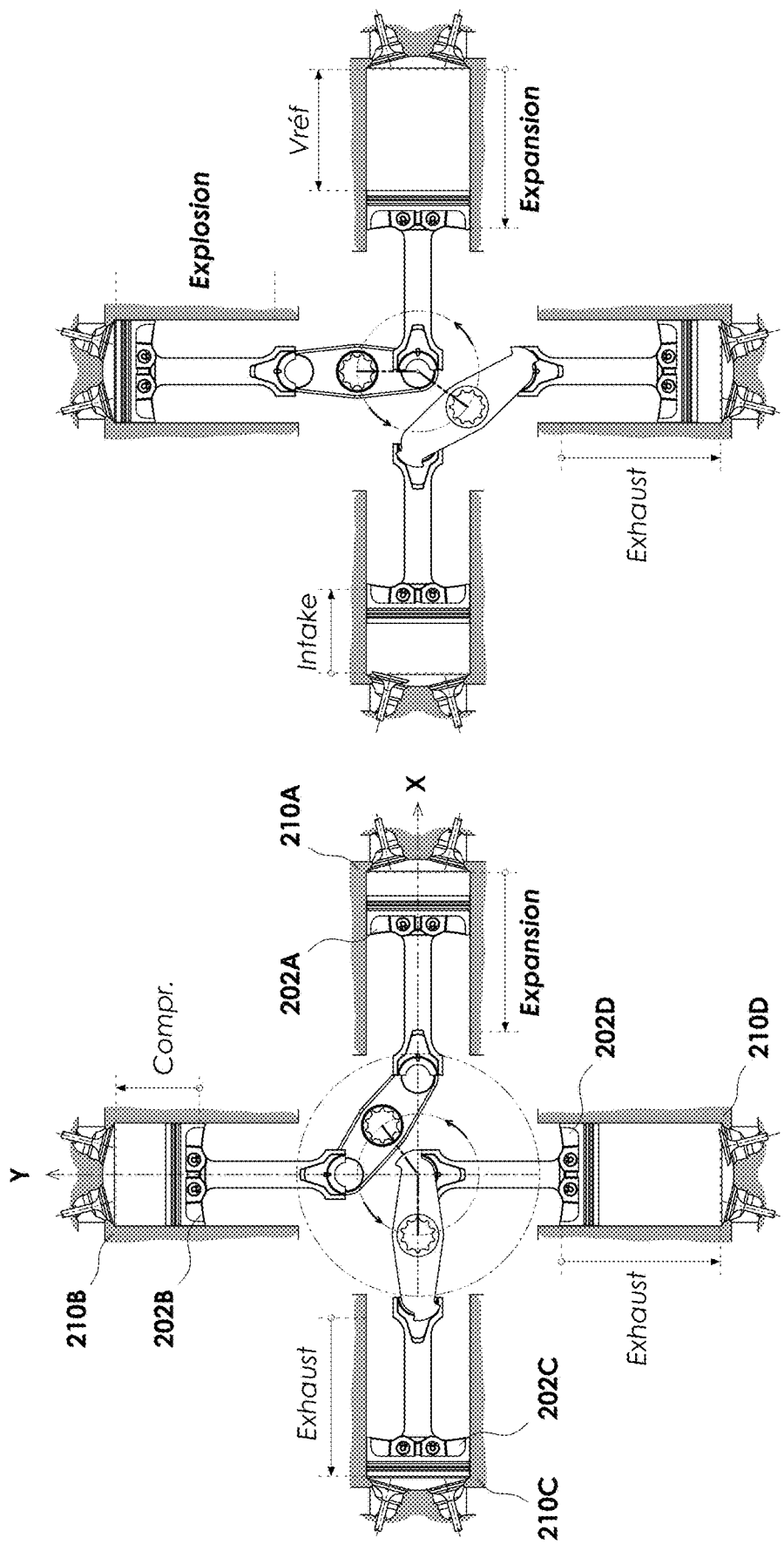

Operating principle of the engine 1 according to the first aspect and according to the second embodiment:

The four strokes of the cycle occur in the cylinders 210, in a spontaneous manner, as illustrated by FIGS. 53 to 60 as follows:

FIG. 53: the cylinder 210A is the seat of the power stroke: expansion.

The piston 202A being in expansion pushes by means of its rod the crank pin I of the connecting rod 104 which ensures in turn the compression in the cylinder 210B via its second crank pin J.

The connecting rod 304 reaches its horizontal position late because of the angular offset of the planet carriers. It thus completes the exhaust of the gases burnt in the cylinder 210C late, hooks onto the rod of the piston 202C at TDC to start the suction of the air via the intake valve, while its first crank pin I' already frees the additional volume of the gases burnt in the cylinder 210D resulting from the prolonged expansion of the piston 202D beyond the point O.

FIG. 54:

The piston 202B reaches its highest point at TDC, at which the compression in the corresponding cylinder is maximum, the fuel is injected to produce combustion: the intake and exhaust valves being closed.

The piston 202A being in prolonged expansion continues to push, by means of its rod, the crank pin I of the connecting rod 104 beyond the point O.

The connecting rod 304 pulls the piston 202C via the hooking mechanism (connection being established), thus creating the vacuum required for the suction of the air via the intake valve, and continues, via the crank pin J', to release the gases burnt in the cylinder 210D through the exhaust valve.

FIG. 55:

The piston 202A reaches its bottom point BP at which the crank pin J is at the second tipping point STP, having swept a prolonged expansion volume: $V_d=V_{réf}+a$, the pressure in the cylinder 210A is close to the atmospheric pressure, this results in a maximum restitution of the energy provided by the gaseous system in combustion.

The piston 202B is in expansion, pushes in turn the crank pin J of the connecting rod 104.

The connecting rod 304 releases the rod of the piston 202C early before reaching the point O, via the contraction of the angular interval of its hooking groove (FIG. 50), and switches towards the piston 202A to start the exhaust of the gases burnt via the exhaust valve.

The volume sucked up by the piston 202C is reduced with respect to the reference volume: $V_a=V_{réf}-a$.

Figure 56:
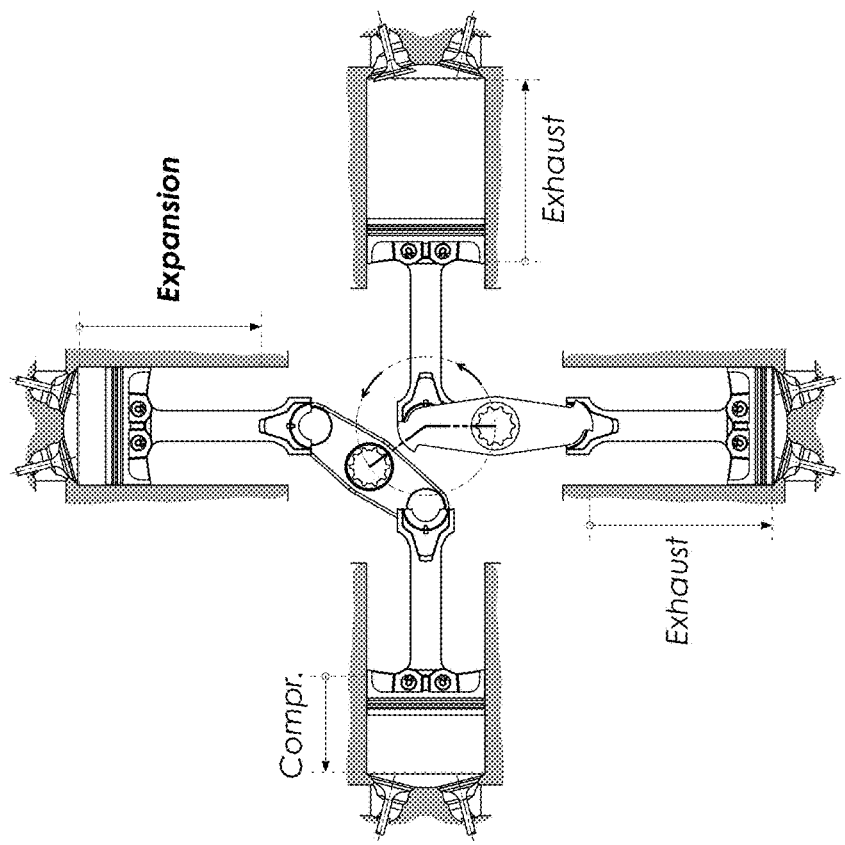

FIG. 56: Same description as FIG. 53, even if it means rotating FIG. 56 by 90° in the clockwise direction.

Figure 55:
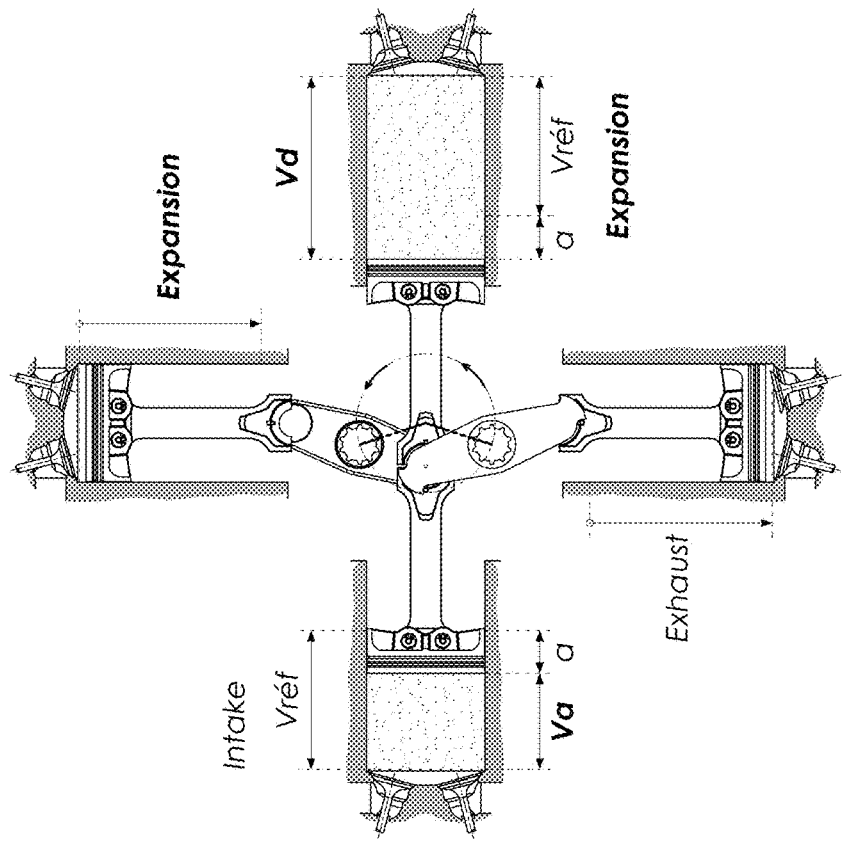
Figure 58:
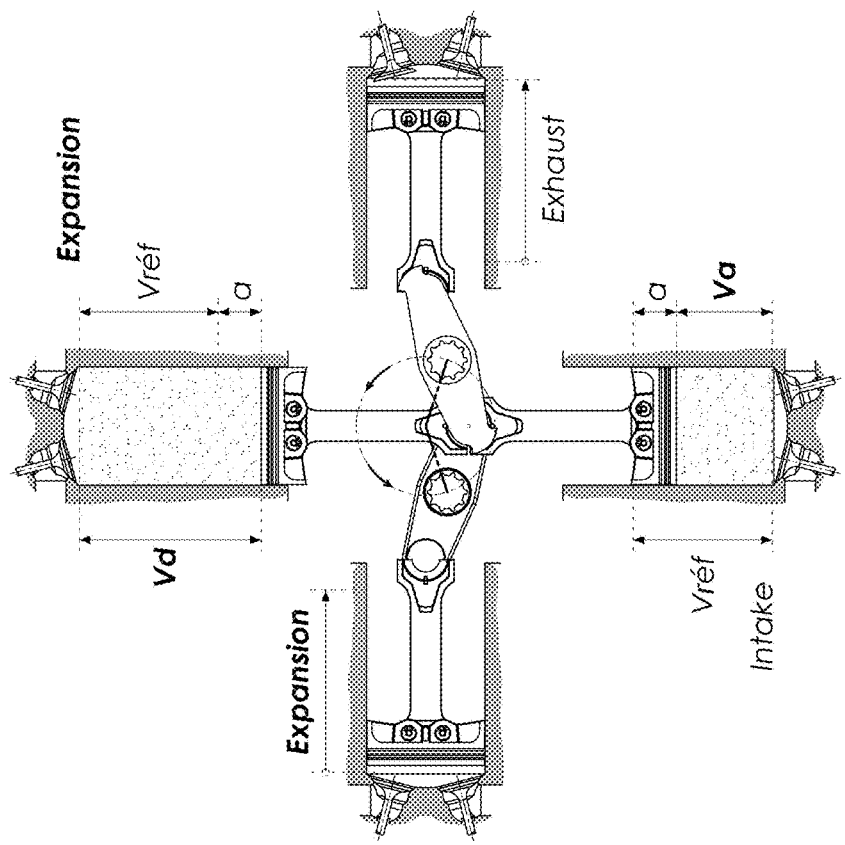
Figure 57:
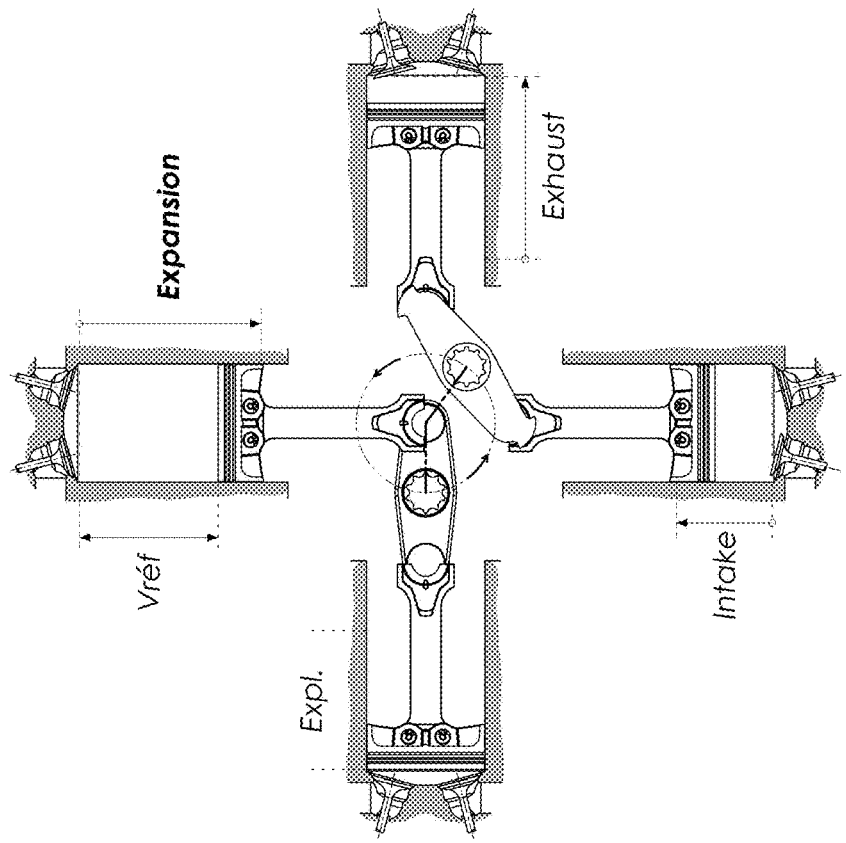
Figure 60:
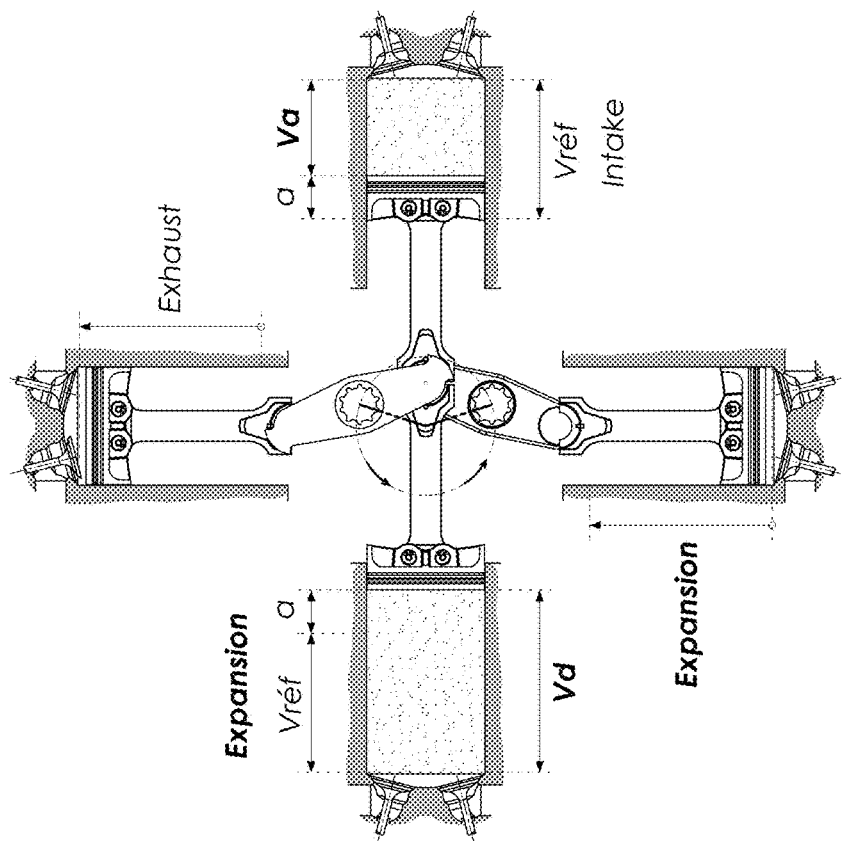
Figure 59:
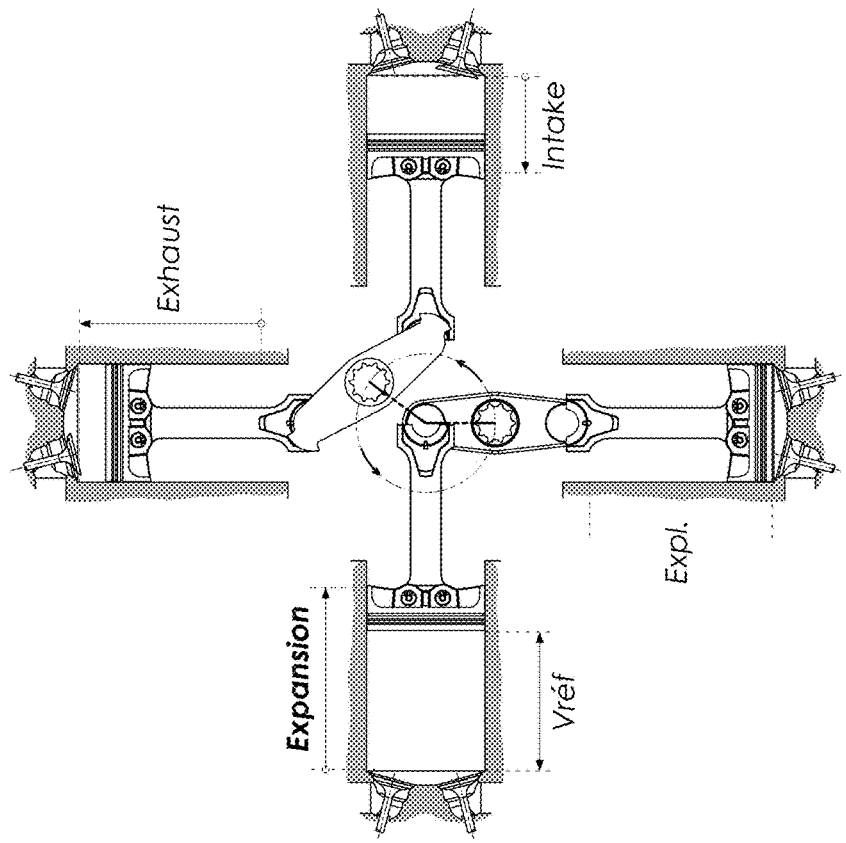

For FIGS. 57 to 60 that follow, the four strokes occur in the cylinders 210 in the same way as FIGS. 53, 54 and 55 described above.

The following is noted according to the above operating principle:

When the planet gear 102 carries out a rotation about the axis Z which corresponds to two rotations of the output shaft 105, the four strokes of the engine cycle occur in each of the four cylinders 210.

The same starting point is reached after a rotation of the planet gear 102, a cycle that repeats itself autonomously is thus obtained.

The first and the second tipping points FTP and STP of each of the pistons 202 are symmetrical with respect to the point O.

The first tipping point FTP of a given piston 202 is identical to the second tipping point STP of the opposite piston and vice versa.

The sum of the compression and expansion volumes of each of the pistons remains unchanged regardless of the value of prolongation: $V_a+V_d=2V_{Réf}$, it is said that the volumes are dependent.

There are four tipping points FTP/STP instead of a single point shared by all the pistons, these points are distributed on the main axes X and Y at a distance:

$$\varepsilon = \frac{a}{S}$$

from the point O, where: S is the area of the cross-section of the piston 202.

When a given piston 202 travels over a prolonged stroke, the planet carrier 303 carries out a rotation of: 90°+δ, which explains the angular prolongation δ of the exhaust profile of the radial cam 305 of the engine 1 according to the second embodiment: see FIG. 49. Likewise, when a given piston 202 completes an intake, the planet carrier 303 carries out a rotation of: 90°−δ, which explains the angular contraction δ: on the one hand, of the suction profile of the radial cam 305 and on the other hand, of the angular interval of the hooking groove at the ends of the passive connecting rod 304 of the engine 1 according to the second embodiment: see FIG. 50.

The explosion in a given cylinder 210 occurs before the completion of the expansion in the predecessor cylinder, there is interference of the power strokes of the two pistons 202.

From the explosion of a given piston 202 and until the completion of the prolonged expansion of the predecessor piston, there are two pistons simultaneously in expansion, concomitantly actuating the two crank pins I and J of the connecting rod 104, for example: during the time interval between FIGS. 54 and 55, the piston 202B and its predecessor 202A simultaneously actuate the connecting rod 104. As a result, the torque available at the output shaft during the period of interference is the sum of the torques generated by each of the two expanding pistons.

At the end of compression at TDC, where the action of a given piston 202 does not have any effect on the rotation of the output shaft, the predecessor piston, in the middle of expansion, still actuates the connecting rod 104 and consequently generates a non-zero torque, because the pressure that exists in the corresponding cylinder is still greater than the atmospheric pressure. As a result, the torque $C_s$ available at the output shaft 105 is never cancelled out.

The passing of TDC at the end of compression of a given piston 202 is ensured by the action of the predecessor piston (see FIG. 54 piston 202B). Thus, the role of the flywheel is limited only to the absorption of irregularity of the engine torque caused by the jerking of the pistons. A flywheel with a small moment of inertia can thus be settled for.

Of course, the engine 1 according to the second embodiment allows to provide better efficiency and thus better consumption and reduced release of CO2 and of NOx pollutants, in comparison to that of the conventional engine with a crank and connecting rod. Nevertheless, this improvement in efficiency is obtained at the cost of reduced power, since it takes in less air and thus less combustible. In order to evaluate this reduction in power, it is judicious to calculate the reduced intake volume $V_a$ according to the reference volume $V_{Réf}$ for an arbitrary prolongation ratio k>1. Given that:

$$V_a + V_d = 2\ V_{Réf} \text{ and } V_d = k\ V_a$$

the reduced compression volume $V_a$ according to the reference volume is thus written in the following form:

$$V_a = \frac{2}{1+k} V_{Réf}$$

In practice, the prolonged thermodynamic cycle can also refer to a conventional crank connecting rod engine, in which the intake valve is maintained open beyond bottom dead center to allow the release of a part of the air previously taken in. The compression stroke is thus shortened, but this time, the expansion stroke remains unchanged $V_d^{BM}=V_{Réf}$, contrary to the engine 1 according to the second embodiment, with equivalent characteristics, which provides a greater expansion volume:

$$V_d = \frac{2k}{1+k} V_{Réf}.$$

As a result, to reach a volumetric prolongation ratio, with a delay of closing of intake valve, equivalent to that of the engine 1 according to the second embodiment, a considerable volume must be released before closing the intake valve.

With an arbitrary ratio of prolongation of expansion: k>1, the volume compressed by a conventional engine with a delay of closing of intake valve is equal to:

$$V_a^{BM} = \frac{V_{Réf}}{k}$$

which is less than that of the engine 1 according to the second embodiment. This comes to writing:

$$V_a = \frac{2k}{k+1} V_a^{BM}$$

where:

$V_a^{BM}$: designates the compression volume of an engine with a crank and connecting rod with a delay in valve closing.

$V_a$: designates that of the engine 1 according to the second embodiment with equivalent characteristics.

For example, with a volumetric prolongation ratio: k=1.5, this gives: $V_a$=1.2 $V_a^{BM}$.

Or 20% more compressed volume with respect to a conventional engine with a crank and connecting rod with a delay in valve closing.

In other words, with equal efficiency, the engine 1 according to the second embodiment remains much more advantageous in terms of specific power in comparison to an engine with equivalent characteristics, with a delay of closing of intake valve.

The engine 1 according to the second embodiment is certainly more advantageous in terms of efficiency with respect to that according to the first embodiment, nevertheless, the reduction of the compression volume that accompanies the prolongation of that of expansion negatively affects the specific power of the engine. The best way to carry out the present invention is therefore that according to an embodiment in which the engine 1 is capable of achieving as much efficiency as that according to the second embodiment and developing a much better power. This amounts to providing the piston 202 with a prolonged expansion, in order to reduce as much as possible the pressure at the end of expansion, while compressing a volume equivalent to the reference volume: $V_{Réf}$.

VI. BEST WAY TO CARRY OUT THE INVENTION

According to the operating principle of the engine 1 according to the two embodiments described above, it can be noted that the dependency between the compression and expansion volumes lies in the fact that the switching of the connecting rod 304 between a piston 202 in intake and its opposite in expansion occurs at the same point and in an instantaneous manner. Thus, to be able to obtain an independence between said volumes, it suffices to extend the time interval of switching, which amounts to releasing the piston during suction well before ending the expansion of the opposite piston, in order to leave it the time to have a prolonged stroke.

To do this, it is proposed according to a best embodiment of the invention characterized in that the pitch diameter of the ring gear 301 is greater than that of the ring gear 101, and in that the two planet carriers 103 and 303 are configured in such a way that the axes of the planet gears 102, 302 and the axis Z are not coplanar.

The engine 1 according to the best embodiment of the invention is implemented by configuring the members below in the following manner:

The pitch diameter of the ring gear 101, mainly defining the kinematic behavior of the engine 1, remains unchanged, the space between the axes of the crank pins I and J of the connecting rod 104, noted as $L_a$, is thus equal to the reference stroke Since the pitch diameter of the ring gear 301 is greater than that of the ring gear 101 (see FIGS. 66 to 69), the distance between the axes of the crank pins I' and J' of the connecting rod 304, noted as $L_p$, is consequently greater than that separating the axes of the crank pins I and J of the connecting rod 104, this gives: $L_p > L_a$ Preferably, the axes of the first and of the second support of the rod 203 are separated by a distance equal to the difference between the pitch radii of the ring gears 301 and 101 or: ($L_p$–$L_a$), in such a way as to end up with a single TDC of the piston 202 at the end of compression and at the end of exhaust: see FIG. 61

Said arrangement of the axes of the two planet gears around the axis Z is obtained by asymmetric planet carriers 103 and 303, each characterized by an angular offset, noted as ψ, as illustrated by: FIGS. 63 and 64, which is carried out, by taking into account the direction of rotation of the engine, in such a way that the expansion stroke is prolonged A radial cam 305 as illustrated by: FIG. 65, the profiles of which are configured in such a way as to ensure the opening of the valves in synchronization with the four strokes of the engine cycle The angular interval of the hooking groove in the two ends of the connecting rod 304 is contracted by an angle: ψ as illustrated by FIG. 62

Operating Principle of the Engine 1 According to the First Aspect and According to the Best Embodiment:

The four strokes of the cycle occur in the cylinders 210, in a spontaneous manner, as illustrated by FIGS. 73 to 80 as follows:

FIG. 73: the cylinder 210A is the seat of the power stroke: expansion.

The piston 202A being in expansion pushes, by means of the first support of its rod, the crank pin I of the connecting rod 104 which ensures in turn the compression in the cylinder 210B via its second crank pin J.

The connecting rod 304 pulls the rod of the piston 202C, via the hooking mechanism (connection being established), thus creating the vacuum required to suck in the air via the intake valve, while the crank pin J' pushed the second support of the rod of the piston 202D in order to release the burnt gases through the exhaust valve.

FIG. 74:

The piston 202A being in prolonged expansion continues to push the crank pin I of the connecting rod 104 beyond the point O.

The piston 202B reaches its highest point at TDC, at which the compression in the corresponding cylinder is maximum, the fuel is injected to produce combustion: the intake and exhaust valves being closed.

The connecting rod 304 releases the rod of the piston 202C at the moment at which the crank pin I of the connecting rod 104 comes into contact with the first support of said rod of the piston 202C at the point O, the intake in the cylinder 210C is thus completed, the volume sucked in is equal to the reference volume: $V_a=V_{réf}$ The crank pin J' continues to push the piston 202D, ensuring the exhaust in the corresponding cylinder 210D.

FIG. 75:

The connecting rod 104 is driven concomitantly by the piston 202B now in expansion and the piston 202A which continues to push the crank pin I beyond the point O. The latter ensures in turn the compression of the gases in the opposite cylinder 210C.

In parallel, the connecting rod 304 reaches its vertical position late given the angular offset of the planet carriers 103 and 303, it thus completes the exhaust of the gases burnt in the cylinder 210D.

Starting from the moment at which the connecting rod 304 releases the rod of the piston 202C (see FIG. 74), the crank pin I' moves freely along the main axis X, before coming into contact with the rod of the opposite piston 202A, thus leaving the time for the latter to carry out a prolonged expansion beyond the point O.

FIG. 76:

The piston 202B, still in expansion, continues to actuate the connecting rod 104 which ensures in turn the compression of the gases in the successor cylinder 210C.

The crank pin J' comes into contact with the rod of the piston 202A, ending its prolonged expansion beyond the point O, the corresponding expansion volume being greater than the reference volume: $V_d=V_{réf}+a$.

The connecting rod 304 being hooked onto the rod of the piston 202D ensures the suction of the gases in the corresponding cylinder 210D.

Figure 77:
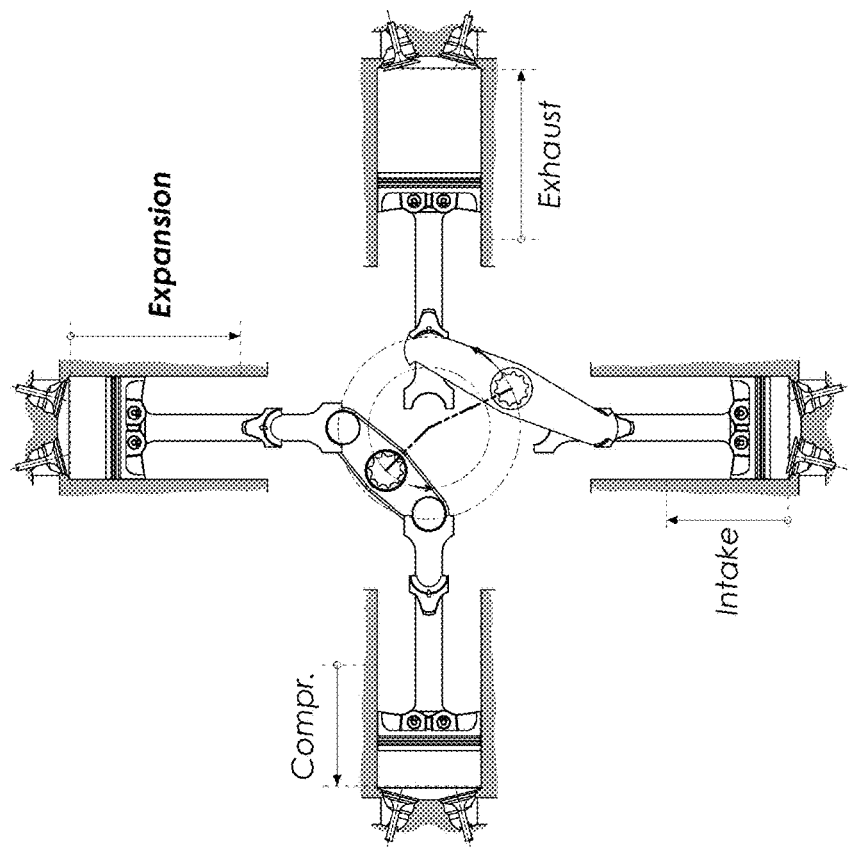

FIG. 77:

Same description as FIG. 73, even if it means rotating FIG. 77 by 90° in the clockwise direction.

Figure 79:
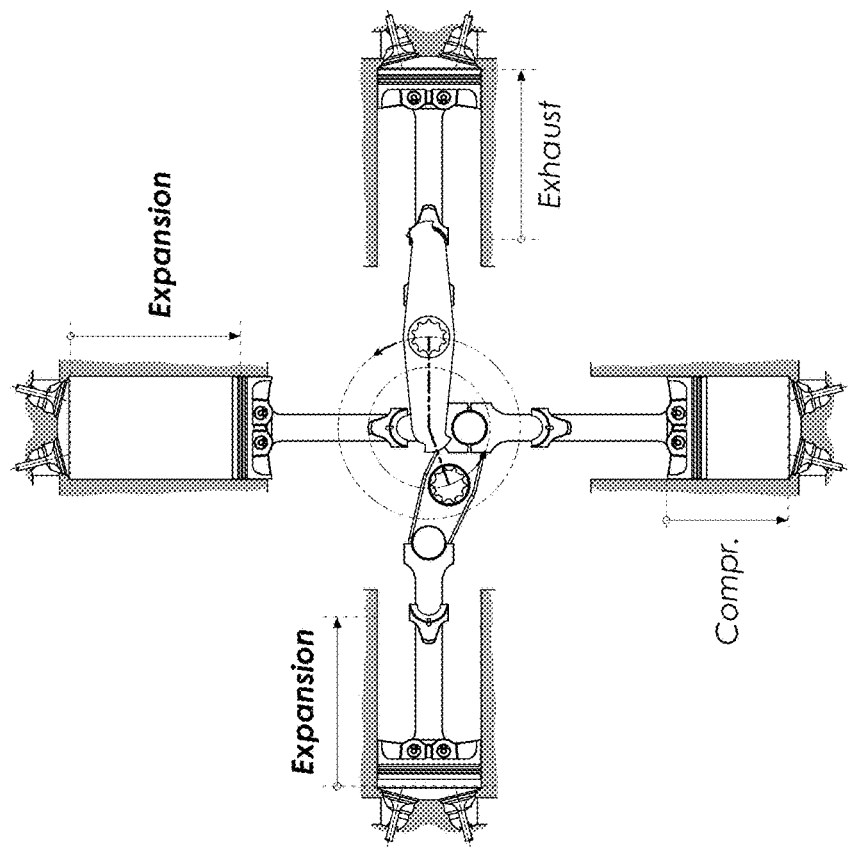

For the following FIGS. 78 to 80, the four strokes occur in the cylinders in the same way as FIGS. 73, 74, 75 and 76 described above.

The following is noted according to the above operating principle:

When the planet gear 102 carries out a rotation about the axis Z which corresponds to two rotations of the output shaft 105, the four strokes of the engine cycle occur in each of the four cylinders.

The same starting point is reached after a rotation of the planet gear 102, a cycle that repeats itself autonomously is thus obtained.

Given that the active unit 100 that recovers the mechanical work provided by the pistons 202 during the power stroke and ensures the compression of the gases in the cylinders 210, as a result, by maintaining the pitch diameter of the ring gear 101 unchanged, the engine 1 according to the invention behaves kinematically in the same manner according to its three embodiments described above during compression and expansion, that being said that the same conditions of ignition of the fuel in the cylinders 210 are present.

The engine 1 according to the third embodiment allows to obtain a prolonged expansion, $V_d=V_{réf}+a$ (see FIG. 76: piston 202A), while keeping the intake volume identical to the reference volume: $V_a=V_{réf}$ (see FIG. 74: piston 202C) It is said that the expansion and intake volumes are independent.

The connecting rod 304 releases a piston 202 in intake well before ending the expansion of the opposite piston 202, which allows to leave the latter the time to have a prolonged expansion (see FIGS. 74 to 76) without resorting to a reduction of the intake volume. Contrary to the engine 1 according to the second embodiment, in which the switching of the connecting rod 304 between the piston in suction and its opposite in expansion occurs at the same point and in an instantaneous manner.

In reference to the equations of the movement of the piston with respect to time described above and given that the pitch diameter of the planet gear 302 is greater than that of the planet gear 102, the speed of movement of a piston 202 during intake and exhaust is greater than that during compression and expansion. Thus, the compression of a volume $V_a$ by the connecting rod 104 requires a rotation of 90° of the planet carriers (see FIGS. 74 to 78: cylinder 210C), while the suction of the same volume $V_a$ by the connecting rod 304 requires only a rotation of (90°−ψ) of the planet carriers (see FIGS. 75 to 78: cylinder 210D), which explains the contraction of the angular interval of the hooking groove of the connecting rod 304.

Likewise, when a piston travels over a prolonged expansion: $V_d=V_{réf}+a$, the planet carriers carry out a rotation of (90°+ψ+ξ) (see FIGS. 74 to 80, cylinder 210B) while the exhaust of the same volume $V_d$ requires only a rotation of (90°−ξ) of the planet carriers (see FIGS. 76 to 79, cylinder 210A). Which justifies the angular contraction of the intake and exhaust profiles in the central cam 24 as illustrated by FIG. 65.

The explosion in a given cylinder 210 occurs before the completion of the expansion in the predecessor cylinder, there is an interference of the power strokes.

From the explosion of a given piston 202 and until the completion of the prolonged expansion of the predecessor piston 202, both pistons are simultaneously in expansion, concomitantly actuating the two crank pinks I and J of the connecting rod 104. As a result, the torque available at the output shaft 105 during the period of interference is the sum of the torques generated by each of the two pistons.

At the end of compression at TDC, at which the action of a given piston 202 does not have an effect on the rotation of the output shaft 105, the predecessor piston 202, in the middle of expansion, still actuates the connecting rod 104 and consequently generates a non-zero torque, because the pressure that exists in the corresponding cylinder is still greater than the atmospheric pressure. As a result, the torque $C_s$ available at the output shaft 105 is never cancelled out.

The passing of TDC at the end of compression of a given piston 202 is ensured by the action of the predecessor piston 202.

The engine 1 according to the best embodiment thus simultaneously allows to provide the pistons with a prolonged expansion in order to take the most advantage of the work provided by the gaseous system and to compress as much volume as that of a conventional engine with a crank and connecting rod with equivalent characteristics and consequently to develop much greater power.

According to the above operating principle, it is noted that the values of the volumes of intake $V_a$ and prolonged expansion $V_d$ depend mainly on the following parameters: the elongation ratio of the connecting rods: $u=L_a/L_p$ and the angular offset of the planet carriers: ψ. It would therefore be judicious to determine these parameters, which allow to satisfy the following two desired conditions:

First condition: Ensure an intake volume identical to the reference volume $V_a=V_{Réf}$.

Second condition: Allow the piston an optimal prolongation in order to lower as much as possible the pressure at the end of expansion.

To do this, the geometric constraints translating these two conditions must be highlighted, in order to derive therefrom the two equations required for the determination of said parameters. The following is noted:

k: the desired ratio of prolongation of expansion, such that: $k=V_d/V_a$

τ: the volumetric compression ratio defined above

ξ and χ: angles that the connecting rods 104 and 304 make with a main axis as illustrated by FIG. 81.

v: the dead volume at the end of compression, this gives: $v=V_a/\tau$

S: the area of the cross-section of the piston.

FIG. 78, highlighting the beginning of the compression in the cylinder 210D, is represented graphically in FIG. 81, in order to emphasize the equation characterizing the first condition which manifests itself as follows: the tipping points FTP of each of the four pistons coincide with the point O:

$$\sin \psi = \frac{L_p - L_a}{L_p} = 1 - u$$

Likewise, FIG. 80, highlighting the end of prolonged expansion of the piston 202B, is represented graphically in FIG. 82, in order to emphasize the equation characterizing the second condition, which manifests itself as follows: The passive connecting rod ends the expansion of the piston when the ratio $V_d/V_a$ reaches the desired elongation ratio: k, this gives:

$$\sin \chi = \frac{V_d - V_a}{S \cdot L_a}$$

Given that:

$$V_a = S \cdot L_a + v \text{ and } V_d - V_a = (k-1)V_a$$

it follows that:

$$\sin \chi = (k-1)\frac{\tau}{\tau - 1}$$

Likewise:

$$L_p \sin \xi + L_a \sin \chi = L_p - L_a$$

By replacing (sin χ) with its expression, this gives:

$$\sin \xi = 1 - u\frac{k\tau - 1}{\tau - 1}$$

Given that the axes of the planet gears 102 and 302 rotate at the same speed of rotation: χ=ψ+ξ, the equation characterizing the second condition is thus written as follows:

$$\text{Arcsin}(1-u) + \text{Arcsin}\left(1 - u\frac{k\tau - 1}{\tau - 1}\right) = \text{Arcsin}\left(k - 1\frac{\tau}{\tau - 1}\right)$$

The two equations necessary for the determination of the parameters u, ψ allowing to satisfy the two desired conditions are thus found. For example, for a prolongation ratio: k=1.40, a compression volume identical to the reference volume $V_a=V_{Ref}$ and a volumetric compression ratio: τ=16, the following approximate values are found: $L_p=1.55\,L_a$ and ψ=20.74°.

Moreover, it is noted according to the operating principle of the engine 1 according to the invention that the contact of the rod 203 on the one hand with the connecting rod 104 at the beginning of compression and on the other hand with the connecting rod 304 at the beginning of exhaust takes place at non-zero speeds and with opposite directions, which causes shocks between said parts. To overcome this problem, it suffices to extend the time interval of collision of the parts in question in order to absorb the shock. To do this, a shock-absorber device comprising shoes 2031 and 2033 respectively connected to the first and second supports of the rod 203 by a sliding connection and at least one elastic element mounted between each of said shoes 2031 and 2033 and the rod 203, allowing to extend the duration of the shock and to consequently reduce its impact on the parts involved, is proposed.

What is claimed is:

1. An internal combustion engine with an epicyclic gear train and reciprocating pistons including at least:
   a cylinder block comprising:
      a collar being configured to bring together a number of cylinders at least equal to one, disposed radially around an axis (Z) and rigidly connected to the collar, the axes of said cylinders called main axes of the engine being perpendicular to the axis (Z) at a point (O), the plane orthogonal to the axis (Z) and passing through the point (O) is called main plane (P);
      a piston guided in coaxial translation in each of said cylinders and being intended to carry out reciprocating linear movements, the head of the piston and the bottom of the corresponding cylinder define a combustion chamber in which the four strokes of an engine cycle occur, the volume of said combustion chamber being variable between a minimum, reached at a moment of the cycle corresponding to a position of the piston called top dead center TDC and a maximum reached at a moment of the cycle corresponding to a position of the piston called bottom point BP, each combustion chamber being supplied by an intake system of an oxidizing gas and a fuel and being in communication with an exhaust system of the burnt gases;
      a valvetrain system comprising a set of components arranged in such a way as to ensure the intake and exhaust of gases in said cylinders in synchronization with the four strokes of the engine cycle;
      a device mounted between each of the pistons and the corresponding cylinder allowing to ensure the insulation and the sealing of the combustion chamber;
      a rod integral with the piston and arranged to move in longitudinal translation along the axis of the corresponding piston;
   at least one active unit comprising a set of members arranged in such a way as to form an epicyclic gear train including at least:
      a ring gear mounted coaxially with respect to the axis (Z), being rigidly connected or derived from material of the collar and being located on a first side of the main plane (P);

a planet gear whose axis is parallel to the axis (Z) including at least one first toothing capable of meshing with the ring gear and being maintained on its orbit by a planet carrier guided in rotation about the axis (Z), the planet gear is connected at a first end of its axis to the planet carrier by a pivot connection, the pitch diameter of the first toothing of the planet gear being equal to the pitch radius of the ring gear;

the active unit further comprises a connecting rod mounted on the axis of the planet gear by a fixing means ensuring a rigid and complete connection and having a number of crank pins (I) equal to the number of the main axes of the engine, the axes of said crank pins (I) are parallel to the axis (Z), pass through the pitch circle of the first toothing of the planet gear and disposed in such a way that when the planet carrier rotates about the axis (Z), the projection of the axis of each of the crank pins (I) on the main plane (P) carries out a reciprocating rectilinear movement along a main axis of the engine by describing a segment, called path of the crank pin (I), the center of which is the point (O) and the length of which is equal to the pitch diameter of the ring gear, the active unit being intended to cooperate by contact via the crank pins (I) with the rods to carry out a reversible transformation of the reciprocating linear movements of the pistons of the cylinder block into a continuous rotational movement of the planet carrier;

at least one passive unit comprising a set of members arranged in such a way as to form an epicyclic gear train including at least:

a ring gear mounted coaxially with respect to the axis (Z), being rigidly connected or derived from material of the collar and being located on the opposite side to the first side of the main plane (P);

a planet gear whose axis is parallel to the axis (Z) including at least one toothing capable of meshing with the ring gear and being maintained on its orbit by a planet carrier guided in rotation about the axis (Z), the planet gear is connected at a first end of its axis to the planet carrier by a pivot connection, the pitch diameter of the toothing of the planet gear being equal to the pitch radius of the ring gear, the planet carrier is arranged to be driven in rotation by at least one of the rotating members of the active unit;

the passive unit further comprises a connecting rod mounted on the axis of the planet gear by a fixing means ensuring a rigid and complete connection and having a number of crank pins (I') equal to the number of the main axes of the engine, the axes of said crank pins (I') are parallel to the axis (Z), pass through the pitch circle of the toothing of the planet gear and disposed in such a way that when the planet carrier rotates about the axis (Z), the projection of the axis of each of the crank pins (I') on the main plane (P) carries out a reciprocating rectilinear movement along a main axis of the engine by describing a segment, called path of the crank pin (I'), the center of which is the point (O) and the length of which is equal to the pitch diameter of the ring gear, the passive unit being intended to cooperate by contact via the crank pins (I') with the rods to carry out a transformation of a continuous rotational movement of the planet carrier into reciprocating translational movements of the pistons of the cylinder block; and an output shaft guided in rotation about the axis (Z) and arranged to be driven in rotation by at least one of the rotating members of the engine.

2. The internal combustion engine according to claim 1, wherein said output shaft is guided in rotation in the ring gear by a rotation guide device, and rigidly connected on one of its ends to a sun gear, the planet gear includes a second toothing capable of meshing with the sun gear, the output shaft being intended to be driven in rotation about the axis (Z) by the planet gear.

3. The internal combustion engine according to claim 1, wherein each of said planet gears is connected at the second end of its axis to the planet carrier of the opposite unit by a pivot connection, in such a way that each of said planet gears is guided in rotation about its axis by both of the two planet carriers, the planet gear of the passive unit being capable of be driven in rotation in the same direction and at the same speed by the planet gear of the active unit.

4. The internal combustion engine according to claim 1, wherein said rod has a first and a second support each having an open semi-cylindrical shape, the axis of which is parallel to the axis (Z) and being able to cooperate by contact respectively with the crank pins (I) and (I') following paths along the main axis of the piston corresponding to said rod, the rod being disconnected from the connecting rods is able to cooperate with said crank pins (I,I') by simple thrust and in a spontaneous manner during compression, expansion and exhaust, phases in which the rod is stressed in compression.

5. The internal combustion engine according to claim 4, wherein it comprises a hooking mechanism intended to establish a connection between the connecting rod and the rod during intake, allowing the connecting rod to pull the piston in order to create the vacuum required for the suction of the gases, and to release said connection at the latest at the beginning of the compression.

6. The internal combustion engine according to claim 5, wherein said hooking mechanism comprises a groove cut into a surface of the connecting rod parallel to the main plane (P), opening on a first side called input side and on a second side called output side; and a finger integral with or derived from material of the rod capable of sliding in said groove during the intake phase, the groove is configured in such a way that said pin enters through the input side at the latest at the beginning of the intake phase and exits through the output side at the latest at the beginning of the compression phase.

7. The internal combustion engine according to claim 5, wherein said active unit is intended, by means of the connecting rod, to actuate the pistons to ensure the compression of the gases in the corresponding cylinders, and to then transform the work provided by the expanding gaseous system during expansion into a rotary torque at the output shaft, the crank pin (I) of the connecting rod comes into contact with the first support of the rod of a piston at the moment of completion of intake at a first point of its path called first tipping point FTP, characterizing the beginning of the compression phase, and pushes the piston until it reaches its highest point at TDC at which the speed of said crank pin (I) is canceled out and at which the compression is maximum, the combustion of the oxidizer/fuel mixture taking place in the vicinity of TDC, the expanding hot gases push the piston which in turn pushes the crank pin (I), by means of the rod, until the end of expansion where the rod and the crank pin (I) separate at a second point called second tipping point STP, characterizing the beginning of the exhaust phase, the expansion stroke of the piston is equal to the distance travelled between TDC and the BP corresponding to the second tipping point STP, said distance is equal to at least the pitch radius of the ring gear.

8. The internal combustion engine according to claim 7, wherein said passive unit is intended, by means of the connecting rod, to actuate the pistons to ensure the exhaust and intake phases, the crank pin (I') of the connecting rod comes into contact with the second support of the rod at the moment at which the crank pin (I) reaches the second tipping point STP, ending the expansion phase, and pushes the piston to eject the burnt gases through the exhaust system until it reaches TDC, at which the speed of the crank pin (I') is cancelled out, the connection between the rod and the connecting rod being established by means of said hooking mechanism, allowing the connecting rod to pull the piston to ensure the intake phase, until the moment at which the crank pin (I) comes into contact with the rod at the first tipping point FTP where said connection is at the latest released.

9. The internal combustion engine according to claim 8, wherein the pitch diameters of the ring gears are equal and wherein the first and second support of the rod are coaxial in such a way as to end up with a single TDC of the piston at the end of compression and at the end of exhaust.

10. The internal combustion engine according to claim 9, wherein said planet carriers are configured in such a way that the axes of the planet gears are symmetrical with respect to the axis (Z) of the engine so that the first and the second tipping point FTP and STP of each of the crank pins (I) coincide with the point (O), in other words the compression and expansion strokes are equal.

11. The internal combustion engine according to claim 9, wherein said planet carriers are configured in such a way that the axes of the planet gears and the axis (Z) of the engine are not coplanar and arranged in such a way that the expansion stroke is greater than the compression stroke, in other words the expanding piston continues to push the crank pin (I) beyond the point (O) until it reaches the second tipping point STP, the expansion stroke being greater than the compression stroke, allowing the engine to implement the Miller-Atkinson cycle.

12. The internal combustion engine according to claim 8, wherein the pitch diameter of the ring gear is greater than the pitch diameter of the ring gear and wherein the axes of the first and the second support of the rod are separated by a distance equal to the difference between the pitch radii of the ring gears in such a way as to end up with a single TDC of the piston at the end of compression and at the end of exhaust.

13. The internal combustion engine according to claim 12, wherein said planet carriers are configured in such a way that the axes of the planet gears and the axis (Z) of the engine are not coplanar and arranged in such a way that the expansion stroke is greater than the compression stroke.

14. The internal combustion engine according to claim 13, wherein the arrangement of the axes of the planet gears and the ratio of the pitch diameters of the ring gears are defined in such a way that the piston carries out a prolonged expansion beyond the point (O) with a compression stroke at least equal to the pitch radius of the ring gear, allowing the engine to implement the Miller-Atkinson cycle without reduction of the compression volume.

15. The internal combustion engine according to claim 4, wherein said rod includes a shock-absorber device comprising shoes each connected to the first and to the second support of the rod by a sliding connection; and at least one elastic element mounted between each of said shoes and the rod allowing to absorb the shock between said rod and the crank pins I and I' with which it cooperates at the beginning of compression and at the beginning of exhaust.

* * * * *